United States Patent
Size, Jr.

(10) Patent No.: US 11,499,583 B2
(45) Date of Patent: *Nov. 15, 2022

(54) FASTENER ASSEMBLY

(71) Applicant: Earl Allen Size, Jr., Rochester Hills, MI (US)

(72) Inventor: Earl Allen Size, Jr., Rochester Hills, MI (US)

(*) Notice: Subject to any disclaimer, the term of this patent is extended or adjusted under 35 U.S.C. 154(b) by 327 days.

This patent is subject to a terminal disclaimer.

(21) Appl. No.: 17/000,554

(22) Filed: Aug. 24, 2020

(65) Prior Publication Data

US 2020/0386258 A1 Dec. 10, 2020

Related U.S. Application Data

(63) Continuation-in-part of application No. 16/869,718, filed on May 8, 2020, now Pat. No. 11,236,778, which is a continuation-in-part of application No. 16/507,104, filed on Jul. 10, 2019, now Pat. No. 11,168,729.

(60) Provisional application No. 62/816,964, filed on Mar. 12, 2019.

(51) Int. Cl.
| | |
|---|---|
| *F16B 37/02* | (2006.01) |
| *F16B 33/00* | (2006.01) |
| *F16B 39/30* | (2006.01) |
| *F16B 37/12* | (2006.01) |
| *F16B 33/02* | (2006.01) |

(52) U.S. Cl.
CPC ............ *F16B 33/002* (2013.01); *F16B 33/02* (2013.01); *F16B 37/122* (2013.01); *F16B 39/30* (2013.01)

(58) Field of Classification Search
CPC ............................ F16B 41/002; F16B 39/028
USPC ................. 411/140, 243, 244, 395, 510, 546
See application file for complete search history.

(56) References Cited

U.S. PATENT DOCUMENTS

| | | | |
|---|---|---|---|
| 885,544 A | | 4/1908 | Summons |
| 893,081 A | | 7/1908 | Kunan |
| 932,395 A | | 8/1909 | Kenney |
| 995,468 A | * | 6/1911 | Kenney |

(Continued)

FOREIGN PATENT DOCUMENTS

| | | |
|---|---|---|
| EP | 0178787 A2 | 4/1986 |
| EP | 0634583 A1 | 1/1995 |

(Continued)

*Primary Examiner* — Gary W Estremsky
(74) *Attorney, Agent, or Firm* — Dinsmore & Shohl LLP

(57) ABSTRACT

A fastener assembly having a nut with interior threads extending from a first end to an intermediate end wall, a narrowed diameter aperture extending from the end wall toward a second end. A first screw has a shaft exhibiting a first exterior thread pattern rotationally inter-engaging with the interior threads of the nut when installed through the first end. A recess formed in an end of the shaft exhibiting a further plurality of interior threads matching a direction of the first thread pattern. A second screw has a second exterior thread pattern opposite the first pattern and, upon being installed through the narrowed aperture, rotationally inter-engaging the interior threads of the first screw, with loosening of either screw being prevented by their counter-threaded orientation. A head of the second screw exhibiting an outer annular rim establishing a resistance fit within an entranceway location of the nut.

18 Claims, 26 Drawing Sheets

(56) References Cited

U.S. PATENT DOCUMENTS

| | | | |
|---|---|---|---|
| 1,138,574 A | | 5/1915 | King |
| 1,357,331 A | | 11/1920 | Ferdinand |
| 1,399,191 A | | 12/1921 | Casali |
| 1,413,024 A | * | 4/1922 | Harrell ............... F16B 39/16 411/932 |
| 1,656,118 A | * | 1/1928 | Joyal ................. F16B 39/16 411/933 |
| 2,313,763 A | * | 3/1943 | Olsen ................. E01B 11/38 411/223 |
| 2,336,164 A | * | 12/1943 | Chaskin ............. F16B 39/16 411/933 |
| 2,391,232 A | * | 12/1945 | Farrell ............... F16B 39/16 411/932 |
| 2,648,367 A | * | 8/1953 | Curran ............... F16B 39/02 411/984 |
| 2,956,293 A | | 10/1960 | McKay |
| 3,124,031 A | * | 3/1964 | Knohl ................. F16B 5/0275 411/932 |
| 3,222,977 A | | 12/1965 | Vaughn |
| 4,043,239 A | | 8/1977 | DeFusco |
| 4,253,509 A | | 3/1981 | Collet |
| 5,314,279 A | | 5/1994 | Ewing |
| 5,391,032 A | | 2/1995 | Vassalotti |
| 5,544,991 A | * | 8/1996 | Richardson ........ F16B 39/12 411/932 |
| 5,562,379 A | | 10/1996 | Rausch et al. |
| 5,855,463 A | | 1/1999 | Newby |
| 6,125,526 A | * | 10/2000 | Wierzchon ........ F16B 5/0275 411/335 |
| 6,676,874 B1 | | 1/2004 | Muller |
| 6,789,993 B2 | | 9/2004 | Ozawa et al. |
| 7,172,380 B2 | * | 2/2007 | Lees .................. F16B 39/16 411/222 |
| 7,213,999 B2 | * | 5/2007 | Haas ................. F16B 5/0275 411/413 |
| 7,857,567 B2 | | 12/2010 | Iwata et al. |
| 8,113,754 B2 | | 2/2012 | Dahl et al. |
| 8,267,630 B2 | | 9/2012 | Moon et al. |
| 8,398,349 B2 | | 3/2013 | Jackson |
| 8,402,605 B2 | | 3/2013 | Courtin et al. |
| 10,989,246 B2 | * | 4/2021 | Sicard ................ F16B 35/005 |
| 2005/0025607 A1 | | 2/2005 | Guantonio |
| 2008/0056809 A1 | | 3/2008 | Kielczewski et al. |
| 2017/0021478 A1 | | 1/2017 | Junkers et al. |
| 2019/0003513 A1 | | 1/2019 | Junkers et al. |

FOREIGN PATENT DOCUMENTS

| | | |
|---|---|---|
| JP | 07004418 A | 1/1995 |
| JP | H8232932 A | 9/1996 |
| JP | 3137118 U | 11/2007 |
| JP | 2009204153 A | 9/2009 |
| WO | 2015054722 A1 | 4/2015 |

* cited by examiner

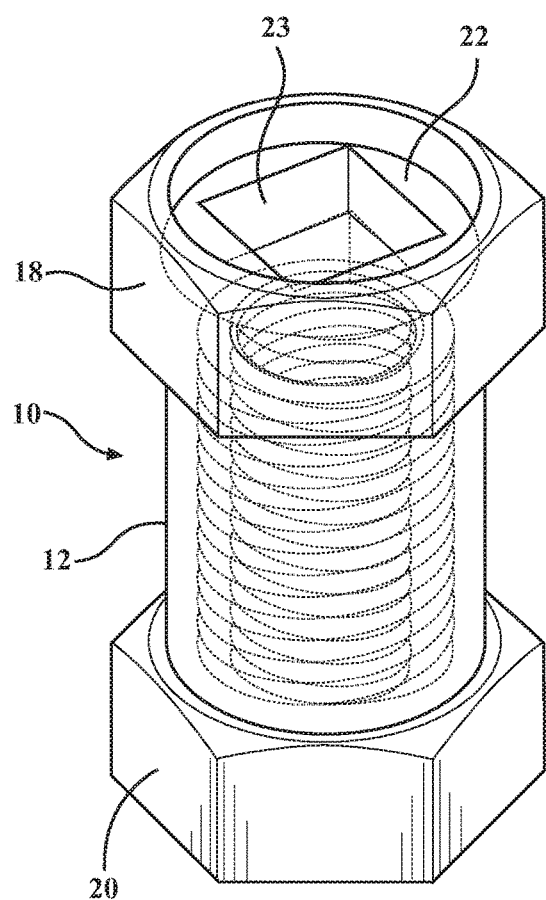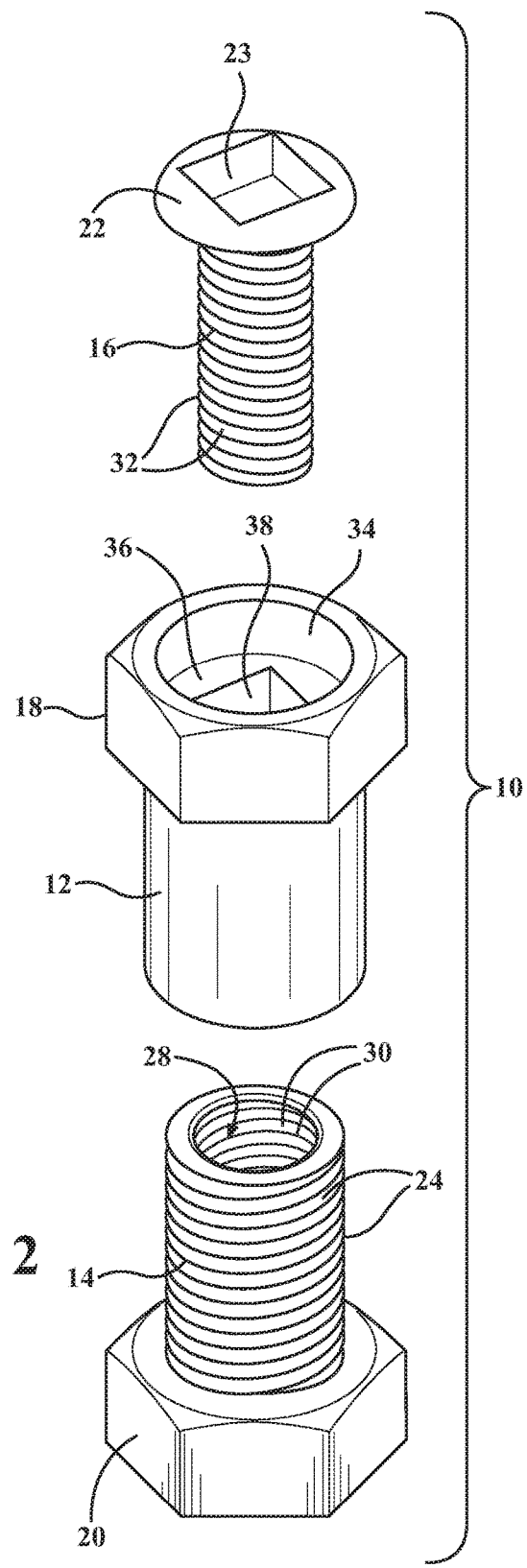
FIG. 1
FIG. 2

FIG. 13
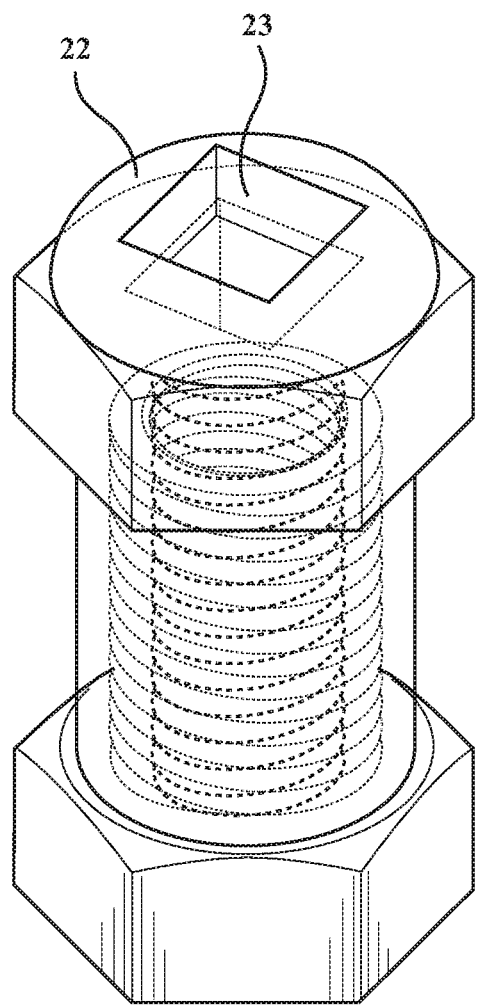
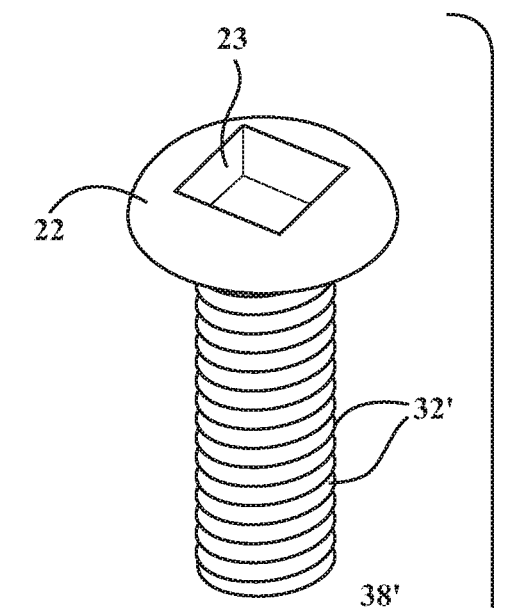
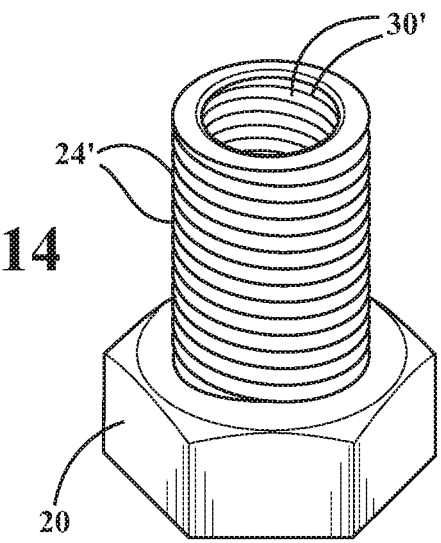
FIG. 14

FIG. 15
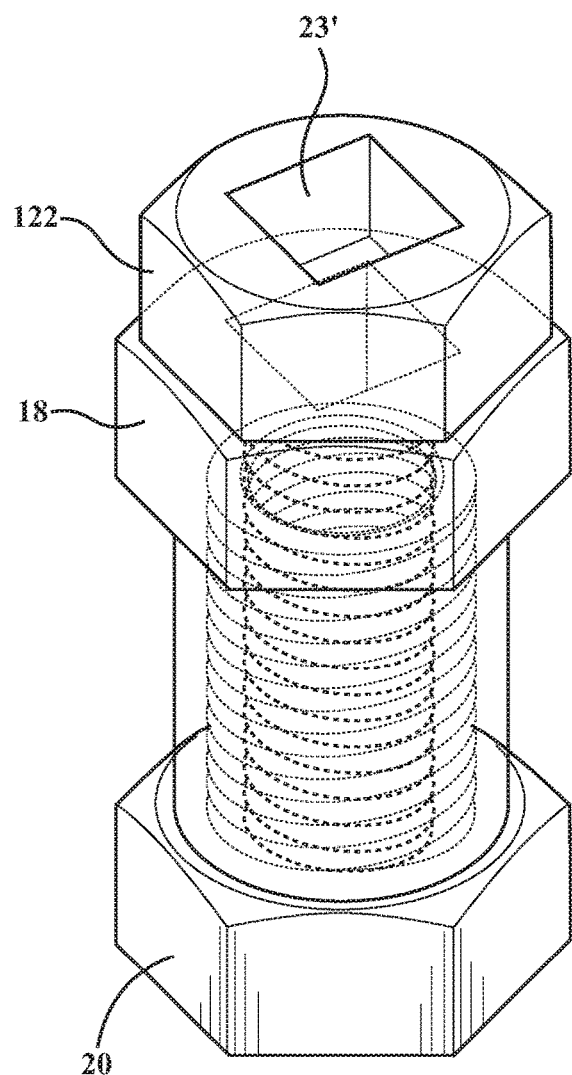
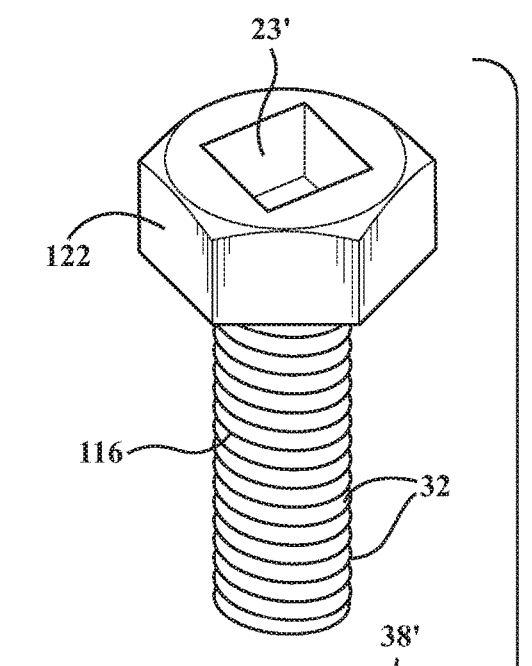
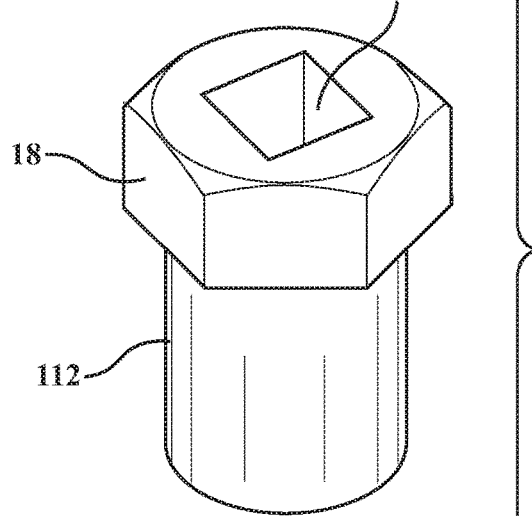
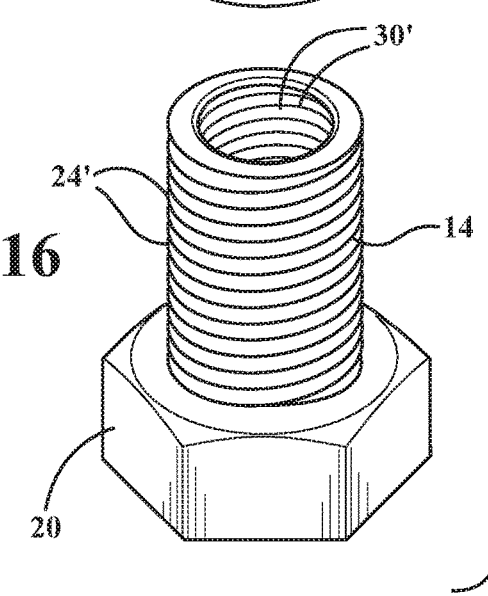
FIG. 16

FASTENER ASSEMBLY

CROSS-REFERENCE TO RELATED APPLICATIONS

The present application is a continuation in part of and claims the priority of U.S. Ser. No. 16/869,718 filed May 8, 2020. The '718 application in turn is a continuation in part of and claims the priority of U.S. Ser. No. 16/507,104 filed Jul. 10, 2019. The '104 application claims the priority of provisional U.S. Ser. No. 62/816,964 filed Mar. 12, 2019.

FIELD OF THE INVENTION

The present invention relates generally to locking fasteners. More specifically, the present invention discloses multi-piece locking fasteners which are provided with counter threaded profiles and which, when installed relative to an intermediate piece or base layer material, prevents loosening of the fastener assembly given the counter-threaded orientations of the first and second fasteners which prevent loosening of the assembly.

In a first embodiment, a three piece configuration includes the intermediate piece or component which is interiorly threaded and open at opposite ends for receiving and first and second opposing directed and threaded screws. The first screw is exteriorly threaded for engaging with the threads of the intermediate component. The first screw also includes a hollow shaft which, upon being installed within a first end of the intermediate component, subsequently receives in a counter-rotatatively threaded fashion the second threaded screw, with loosening of either the opposing and inter-seating end screws being prevented via their counter-threaded orientations.

In a second embodiment, the intermediate component of the first embodiment is reconfigured as a thickened base layer, within which is configured a first wider diameter passageway exhibiting a first interiorly threaded orientation. A second narrower diameter passageway exhibits a second opposite threaded orientation and extends a distance in communication with and beyond a bottom end wall of the first wider passageway.

A first redesigned elongated and wider diameter bolt style fastener includes a head and a stem, the stem having a first arrangement of exterior threads threadably inter-engageable with the threads configured within the wider diameter passageway of the base layer. The first fastener further includes a further interior passageway extending its axial length (head and stem), and which can be optionally threaded along any of a partial or entire length in a counter direction relative to the exterior threads.

A second narrower diameter bolt style fastener includes a head and a partially or fully threaded stem and, following the wider diameter fastener being installed into the base layer to secure there-against any second and typically thinner layer, the second fastener being dimensioned to be installed through the interior passageway of the wider fastener. Upon being fully installed, the end most portion of the inner fastener stem projects beyond a stem end face of the wider fastener and abutting end wall within the inner layer and is threadably inter-engaged with the further extended counter oriented second narrower diameter passageway. In this manner, loosening of either the opposing coaxial seating bolt fasteners is prevented via their counter-threaded orientations.

A yet further embodiment teaches a fastener assembly having a nut with interior threads extending from a first end to an intermediate end wall, a narrowed diameter aperture extending from the end wall toward a second end. A first screw has a shaft exhibiting a first exterior thread pattern rotationally inter-engaging with the interior threads of the nut when installed through the first end.

A recess formed in an end of the shaft exhibits a further plurality of interior threads matching a direction of the first thread pattern. A second screw has a second exterior thread pattern opposite the first pattern and, upon being installed through the narrowed aperture, rotationally inter-engaging the interior threads of the first screw, with loosening of either screw being prevented by their counter-threaded orientation. In this fashion, first and second sandwiching layers having aligning apertures receive the first screw shaft and are compressed between the first surface of the nut and an opposing surface of an enlarged head of the first screw.

An outer annular rim of the head of the second screw establishes a resistance fit against an opposing inner surface associated with an entranceway location of the nut extending from the second end in communication with the narrowed diameter aperture. In application, the resistance fit provides an additional measure of resistive engagement for preventing initial loosening of the second screw.

The resistive engaging annular rim can exhibit a variety of protuberances or patterns, such as including but not limited to each of teethed or spiraling configurations. The opposing surface profiles established between the outer annular rim of the second screw and entranceway location of the nut can also include any of linear, dovetailed or other configurations.

A further sub-variant contemplates the fastener assembly being incorporated into a foot or pedestal support of a machine or other appliance for providing combined ground support and leveling. According to this sub-variant, each of the second (upper) end of the nut and the (lower) end of the enlarged head of the first screw can be notched for seating each of upper and lower configured support layers, these further incorporating rotational bearing surfaces. At least the upper support layer includes an aperture for permitting passage of a tool bit for engaging the head of the second screw and which, upon rotation in a tightening direction, facilitating uni-directional linear adjustment of the nut relative to the first screw.

A further related embodiment substitutes the second screw with a reconfiguration of the first screw to incorporate a second reduced diameter and counter-threaded shaft integrally extending beyond an end wall of the first threaded shaft. Upon threaded installation through the first end of the nut, an end most portion of the second reduced diameter and counter threaded shaft extends beyond the second end of the nut. A second nut exhibits interior threads mating with those of the projecting end most portion of the second reduced diameter shaft and, upon installation, provides counter tightening via the opposing thread patterns of the first and second shafts.

BACKGROUND OF THE INVENTION

The prior art is documented with examples of fasteners, such as which are configured in an attempt to prevent loosening when employed in dynamic environments. A first and most basic example of this is the conventional threaded bolt fastener with attachable and interiorly threaded nut. A spring washer can either be integrated into the nut or separately provided.

Other examples include the locking threaded fastener of Ewing, U.S. Pat. No. 5,314,279, which teaches a locking threaded fastener of the wedge-action type with threaded and threadless nut members with wedge elements therebetween for wedging the nut members apart when the threaded nut member is turned in the loosening direction. In a two-piece nut, the threadless nut member has a flat inner surface for engaging the workpiece and the wedge elements have engaging surfaces with a coefficient of friction therebetween which is less than that between the flat inner surface and the workpiece surface. In a three-piece nut, a third nut member, in the form of a washer, is provided with a flat inner surface for engaging the workpiece. The wedge elements have engaging surfaces with a coefficient of friction less than that between the third nut member and the threadless nut member which, in turn, is less than that between the third nut member in the workpiece.

U.S. Pat. No. 5,562,379, to Rausch et al., teaches a vibration resistant fastener having a pin and a collar. The pin is threaded or peripherally grooved. At a central location, the major diameter of the thread or groove is reduced to a diameter which is still larger than its minor diameter. A collar is threaded or swaged on to the pin and collar material is pressed into an open region that was formed by the reduction of the major diameter, to form a thread lock.

U.S. Pat. No. 5,564,875, to Matthews, teaches a locking fastener (10) having a nut (12) with a threaded portion (14) formed about a central axis (16) of the fastener. A head portion (18) of the nut is formed integral to the threaded portion (14), for gripping the fastener during tightening or loosening. An inner member (22) is provided coaxial with the head portion (18) and is designed to be mechanically coupled to an underside of the head portion (18) so as to be substantially immobile relative to the head portion. The inner member (22) is provided with inclined cam means (24) in the form of a plurality of cam surfaces arranged in an annular configuration about the inner member (22). A locking member (26) is provided coaxial with the threaded portion (14) and has a matching cam means (28) on one face adapted to rotatably interengage in facing relation with the inclined cam means (24) on inner member (22).

Matthews 875' further depicts a first pressure transmitting surface (30) on the opposite face of the locking member (26) which is rotatably received in facing relation to a second pressure transmitting surface (34) provided on an outer member (32). The outer member (32) is coaxial with the locking member (26). A solid friction reducing material in the form of an annulus (36) is located between the first pressure transmitting surface (30) of the locking member (26) and the second pressure transmitting surface (34) of the outer member (32). In use, the outer member (32) can be held stationary relative to a fastened object so that the friction reducing annulus (36) can act as a bearing for the head portion (18) during tightening or loosening of the fastener and when the fastener has been tightened and the locking member has been locked in position relative to the outer member (32), inadvertent loosening of the head portion (18) due to vibration can be inhibited by the interengaging cam means (24, 28).

SUMMARY OF THE PRESENT INVENTION

As previously described, the present invention discloses multi-piece locking fasteners which are provided with counter threaded profiles and which, when installed relative to an intermediate piece or base layer material, prevents loosening of the fastener assembly given the counter-threaded orientations of the first and second fasteners which prevent loosening of the assembly. In a first embodiment, a three piece locking fastener includes an interiorly threaded intermediate component open at opposite ends. A first screw having a first exterior thread pattern rotationally inter-engages with the interior threads of the intermediate component when installed through a first selected one of the opposite ends, the first screw having a hollow shaft exhibiting a further plurality of interior threads matching a direction of the first thread pattern. A second screw has a second exterior thread pattern opposite the first pattern and, upon being installed within the other selected one of the opposite ends, rotationally inter-engages the interior threads of the first screw, so that loosening of either of the first and second screws being prevented by their counter-threaded orientation.

Additional features include each of the intermediate component and a selected one of the first and second screws having an enlarged head with a number of interconnected sides having a polygonal shape. The second screw further includes a curved and enlarged diameter head.

Other features include a tool bit engageable recess profile incorporated into the enlarged head. The intermediate component further includes an end proximate undercut recess for receiving the enlarged head of the second fastener. A recessed ledge is configured within the undercut recess of the intermediate component for seating an underside of the enlarged head of the second fastener in an installed position. A polygonal inner perimeter can be configured in the undercut recess for communicating an extending stem of the second fastener within the intermediate component and in engagement with the hollow threaded interior of the previously installed first fastener.

Yet additional features include the intermediate component and the first and second fasteners each further including a rigid material not limited to a steel or heavy duty nylon construction. The first and second layers have aligning apertures through which a stem portion of the intermediate component extends, with the enlarged polygonal shaped heads established by the intermediate component and the selected one of the first and second screws compressing against opposite edge surfaces of the layers adjoining the apertures.

In a second embodiment, the intermediate component of the first embodiment is reconfigured as a thickened base layer, such as a steel or other suitable rigid metal, and within which is configured a first wider diameter passageway exhibiting a first interiorly threaded orientation. A second narrower diameter passageway exhibits a second opposite threaded orientation and extends a selected distance within the base layer in communication with and beyond a bottom end wall of the first wider passageway.

A first redesigned elongated and wider diameter bolt style fastener is provided and includes a head and a stem, the stem having a first arrangement of exterior threads threadably inter-engageable with the threads configured within the wider diameter passageway of the base layer. The first fastener further includes a further interior passageway extending its axial length (head and stem), and which can be optionally threaded along any of a partial or entire length in a counter direction relative to the exterior threads.

A second narrower diameter bolt style fastener includes a head and a partially or fully threaded stem and, following the wider diameter fastener being installed into the base layer to secure there-against any second and typically thinner layer, the second fastener being dimensioned to be installed through the interior passageway of the wider screw. Upon being fully installed, the end most portion of the inner fastener stem projects beyond a stem end face of the wider fastener and abutting end wall within the inner layer and is threadably inter-engaged with the further extended counter oriented second narrower diameter passageway. In this manner, loosening of either the opposing coaxial seating bolt fasteners is prevented via their counter-threaded orientations.

An additional embodiment includes a fastener assembly having a nut with interior threads extending from a first end to an intermediate end wall, a narrowed diameter aperture extending from the end wall toward a second end. A first screw has a shaft exhibiting a first exterior thread pattern rotationally inter-engaging with the interior threads of the nut when installed through the first end.

A recess formed in an end of the shaft exhibits a further plurality of interior threads matching a direction of the first thread pattern. A second screw has a second exterior thread pattern opposite the first pattern and, upon being installed through the narrowed aperture, rotationally inter-engaging the interior threads of the first screw, with loosening of either screw being prevented by their counter-threaded orientation. In this fashion, first and second sandwiching layers having aligning apertures receive the first screw shaft and are compressed between the first surface of the nut and an opposing surface of an enlarged head of the first screw.

An outer annular rim of the head of the second screw establishes a resistance fit against an opposing inner surface associated with an entranceway location of the nut extending from the second end in communication with the narrowed diameter aperture. In application, the resistance fit provides an additional measure of resistive engagement for preventing initial loosening of the second screw.

The resistive engaging annular rim can exhibit a variety of protuberances or patterns, such as including but not limited to each of teethed or spiraling configurations. The opposing surface profiles established between the outer annular rim of the second screw and entranceway location of the nut can also include any of linear, dovetailed or other configurations.

A further sub-variant contemplates the fastener assembly being incorporated into a foot or pedestal support of a machine or other appliance for providing combined ground support and leveling. According to this sub-variant, each of the second (upper) end of the nut and the (lower) end of the enlarged head of the first screw can be notched for seating each of upper and lower configured support layers, these further incorporating rotational bearing surfaces. At least the upper support layer includes an aperture for permitting passage of a tool bit for engaging the head of the second screw and which, upon rotation in a tightening direction, facilitating uni-directional linear adjustment of the nut relative to the first screw.

A further related embodiment substitutes the second screw with a reconfiguration of the first screw to incorporate a second reduced diameter and counter-threaded shaft integrally extending beyond an end wall of the first threaded shaft. Upon threaded installation through the first end of the nut, an end most portion of the second reduced diameter and counter threaded shaft extends beyond the second end of the nut. A second nut exhibits interior threads mating with those of the projecting end most portion of the second reduced diameter shaft and, upon installation, provides counter tightening via the opposing thread patterns of the first and second shafts. A compressible washer can be positioned between the first and second nuts.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an assembled and partially transparent view of a three piece fastener according to a first variant of the present invention;

FIG. 2 is an exploded view depicting the three piece fastener of FIG. 1 with the intermediate component and first (bottom) hollow screw and second (top solid screw);

FIG. 13 is an assembled and partially transparent view of a three piece fastener as substantially shown in FIG. 6 with the direction of the first and second screw threads being reversed;

FIG. 14 is an exploded view depicting the three piece fastener of FIG. 9, again with the intermediate component and first (bottom) hollow screw and second (top solid screw) and reverse thread patterns exhibited on the top and bottom screws;

FIG. 15 is an illustration similar to previous FIGS. 1 and 8 of an assembled and partially transparent view of a three piece fastener according to a third variant of the present invention;

FIG. 16 is an exploded view depicting the three piece fastener of FIG. 15 with the intermediate component and first (bottom) hollow screw and second (top solid screw), the second top screw being alternately configured from that shown in FIG. 9;

DETAILED DESCRIPTION OF THE PREFERRED EMBODIMENTS

Figure 4:
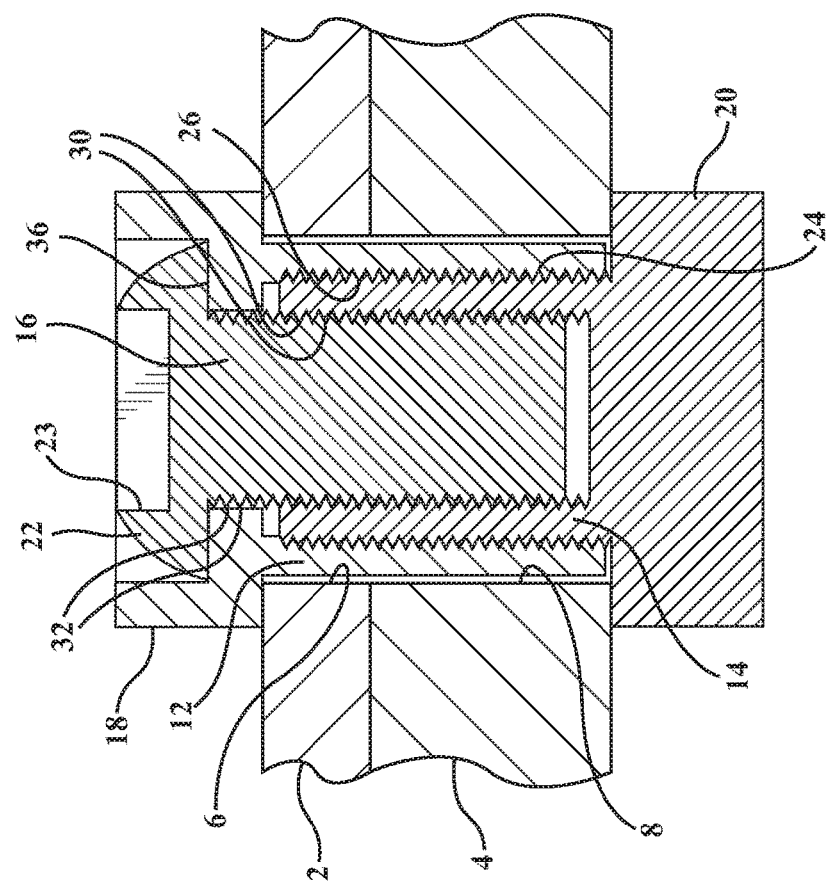
FIG. 4 is an axial cutaway view depicting the assembly of FIG. 1.

With reference to the following illustrations, the present invention discloses a multiple variants fastener assembles for use such as in dynamic environments in which vibrations and other effects are in play. This can include without limitation such operating environments as skate blade fasteners for compressively attaching a first blade layer to a second layer, such as further including a support plate or the like formed with the bottom of the skate. Other applications include the three piece fastener being integrated into a wheel to hub attachment interface, such as for a vehicle.

Referring initially to FIG. 1, generally depicted at 10 is an assembled and partially transparent view of a three piece fastener according to a first non-limiting variant of the present invention. As further shown in the exploded view of FIG. 2, the three piece fastener includes intermediate component 12 and first (bottom) hollow screw 14 and second (top) solid screw 16. Consistent with all of the variants, the intermediate component 12 and first 14 and second 16 fasteners can be constructed of any rigid material not limited to steel, carbon steel or any durable composite (e.g. nylon or polymer) material. As further understood, the screws 14 and 16 are also commonly termed as "threaded bolts" however can include any other suitable configuration for inter-engaging with the intermediate component 12 in the manner described herein.

Figure 3:
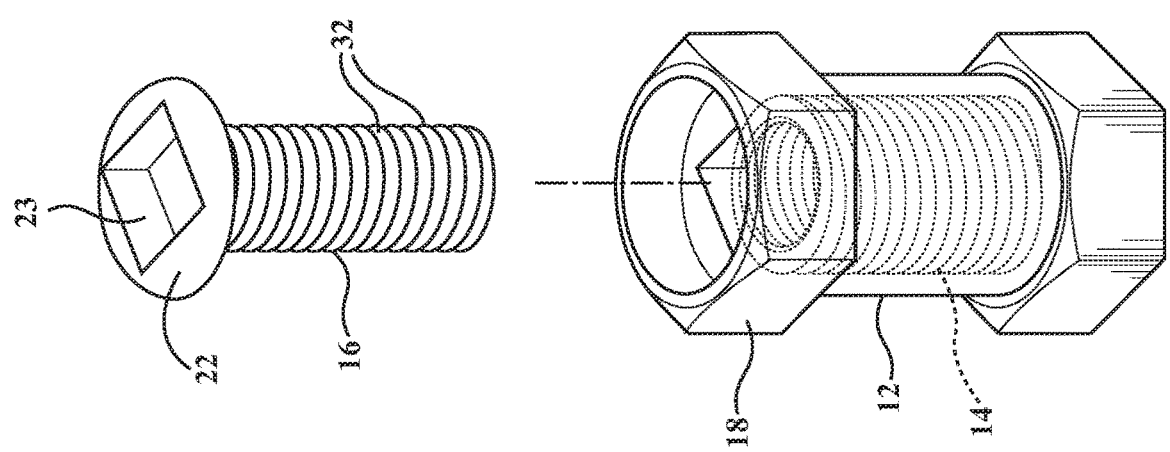
FIG. 3 is a partially exploded view of FIG. 1 and illustrating the lower or first hollowed screw engaged within the lower open and interiorly threaded end of the intermediate component prior to engagement of the upper or second solid screw.
Figure 5:
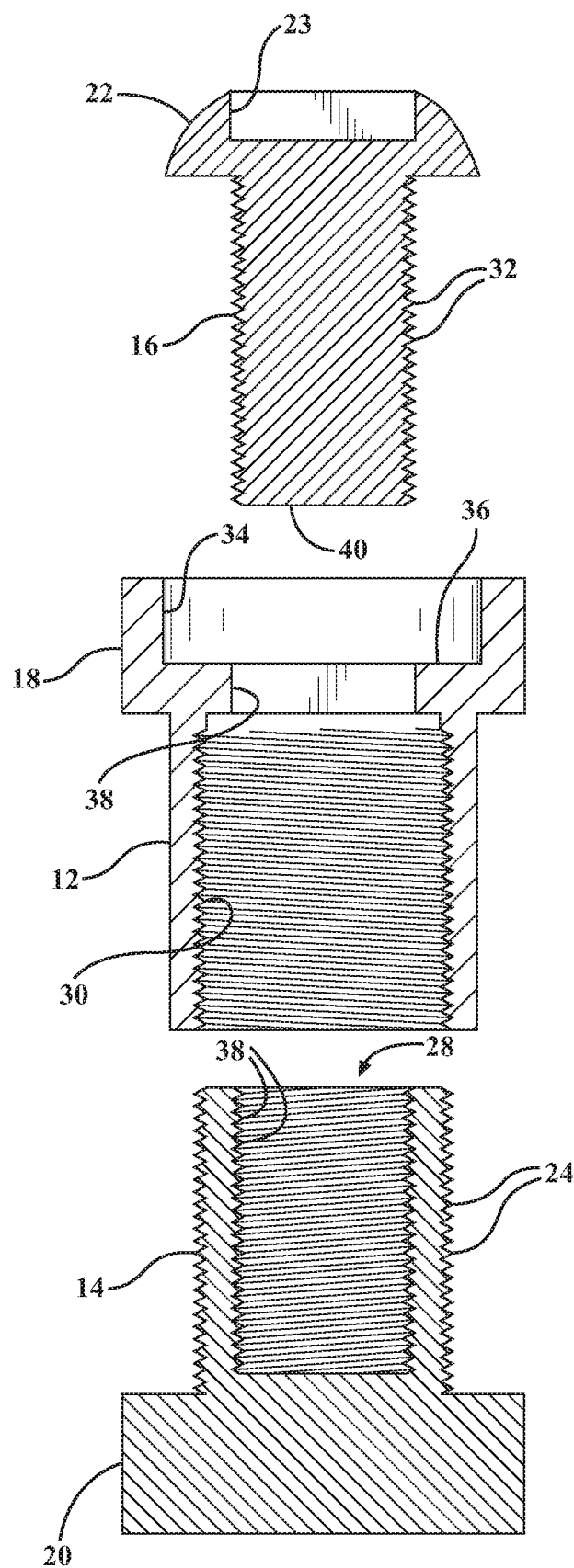
FIG. 5 is an exploded axial cutaway view corresponding to FIG. 2.

FIG. 3 is a partially exploded view of FIG. 1 and illustrating the lower or first hollowed screw 14 engaged within the lower open and interiorly threaded end of the intermediate component 12 prior to engagement of the upper or second solid screw 16. FIG. 4 is an axial cutaway view depicting the assembly of FIG. 1 and further showing first 2 and second 4 layers, each having aligning apertures depicted by inner perimeter surfaces 6 and 8, respectively, and through which a stem portion (again at 12) of the intermediate component extends. FIG. 5 further provides is an exploded axial cutaway view corresponding to FIG. 2 of the three piece fastener.

As previously described, the layers 2 and 4 are generally represented and can include any configuration or application not limited in one potential application to such as an attachment fastener for a skate blade to a flange, bracket or other support surface. In a further application, the layers 2 can correspond to an inner rim or wheel supporting a tire in attachment to a wheel hub. In each instance, the present invention serves to provide a durable fastener arrangement which resists loosening in response to vibrations and the like, such as which can be typical of dynamic operating environments.

The intermediate component includes an enlarged polygonal shaped head, such as which is depicted as a hex head configuration, see at 18, which is shown proximate its upper open end. At least one of the selected screws 14/16 (or bolt threads) likewise include an enlarged hex head which is depicted in FIG. 1 by hex head 20 associated with the lower or first bolt 14. Without limitation, the hex head can be substituted by any other circular or other type of fastening tool, such including but not limited to a multi-sided polygonal shape head having any of a triangular, square, pentagonal or other shape exhibiting a number of interconnected sides, it also being envisioned that the polygonal shaped enlarged heads can be reconfigured in other shapes consistent with the use of any tightening or loosening tool.

As also shown, the upper or second screw 16 includes a curved and enlarged diameter head 22. A tool bit engageable recess (see square profile 23) is formed in the enlarged head 22 to facilitate engagement by a tool bit (not shown) for securing the second (top) screw 16 following pre-threaded engagement of the exterior threads (at 24) of the lower screw 14 within the interior threads (at 26) of the intermediate component 12.

As further shown, the first screw 12 includes a hollow shaft (see generally at 28 in FIG. 2) exhibiting a further plurality of interior threads (further at 30) matching a direction of the first thread pattern 24. In comparison, the second screw 16 exhibits a second exterior thread pattern 32 opposite said first pattern and upon being installed within the other selected one of the opposite ends (depicted as the upper end of the intermediate component 12 in FIGS. 1-5), results in rotationally inter-engaging of the thread pattern 32 with the opposing interior thread pattern 30 of the first screw 14, with loosening of either of the first 14 and second 16 screws being prevented by their counter-threaded orientation.

Additional features include the intermediate component 12 exhibiting an end proximate undercut recess, see annular inner rim surface 34 communicated with undercut ledge 36 in FIG. 2, this for receiving and seating the enlarged head 22 of the second fastener 16 in the manner best further shown in FIG. 5. A polygonal inner perimeter (see at 38) configured in the undercut recess for communicating the solid extending stem (at 40 in FIG. 5) of the second fastener within the intermediate component 12 and into engagement with the hollow threaded interior 28 of the previously installed first fastener 14. The fasteners provided can again include, without limitation, any cross sectional shape not limited to circular or other configuration.

Figure 6:
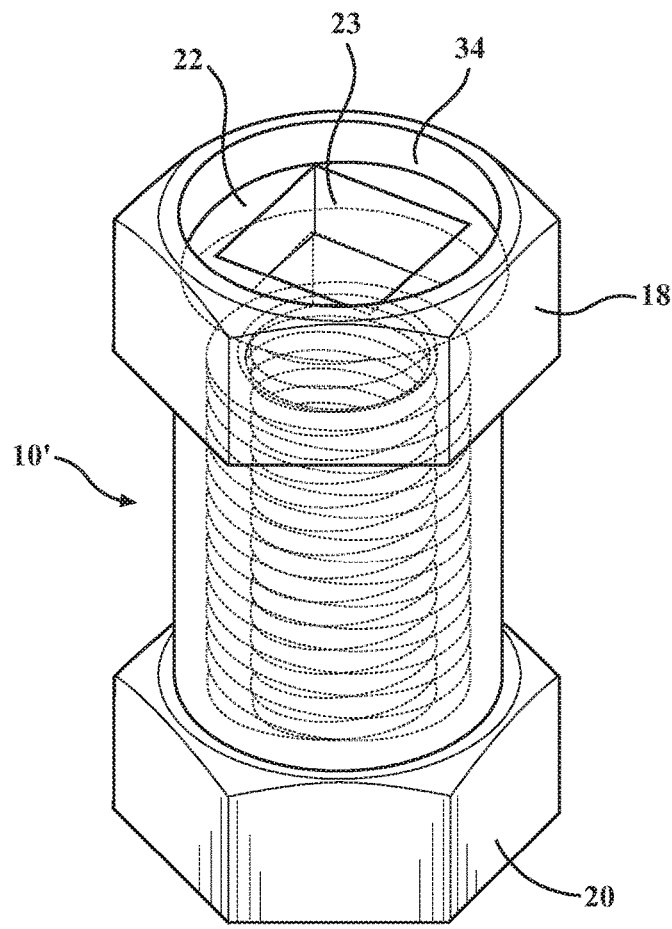
FIG. 6 is an assembled and partially transparent view of a three piece fastener as substantially shown in FIG. 1 with the direction of the first and second screw threads being reversed.
Figure 7:
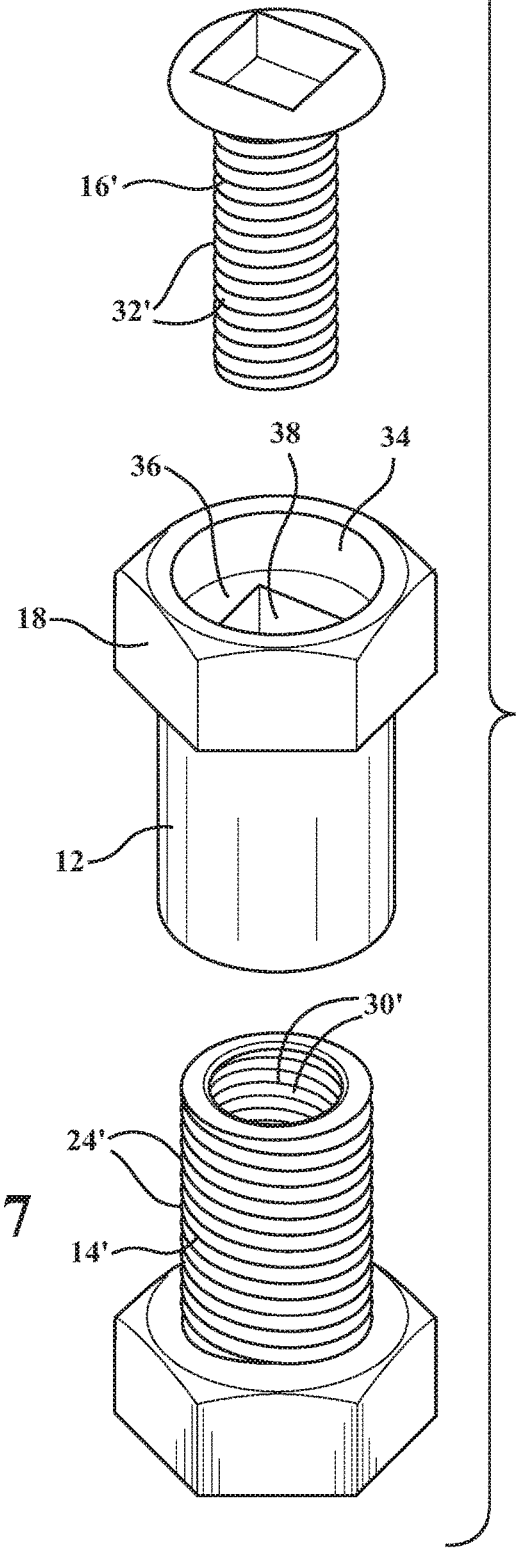
FIG. 7 is an exploded view depicting the three piece fastener of FIG. 6, similar to that previously shown in FIG. 2 and again with the intermediate component and first (bottom) hollow screw and second (top solid screw) with reversed thread patterns.

FIG. 6 is an assembled and partially transparent view of the three piece fastener as substantially shown in FIG. 1, and further depicted at 10' with the direction of the first and second screw threads being reversed as referenced by threads 24' of the first fastener, at 14' as further shown in FIG. 7, arranged in a reversed directional pattern from those depicted at 32' for second fastener 16', as also shown in FIG. 7. FIG. 7 is an exploded view depicting the three piece fastener of FIG. 6, similar to that previously shown in FIG. 2 and again with the intermediate component 12', first (bottom) hollow screw 14' and second (top solid screw) 16' with the reversed thread patterns 24' and 32'. An interior threaded pattern 30' of the intermediate component 12' (corresponding to that previously shown at 30 in FIG. 4) is likewise reversed to match that of the exterior threads 24'. Additionally, and for purposes of the present description, the reference to screw thread direction can also include the terms first/second, left/right or first and second opposing interchangeably and without limitation.

FIGS. 8-12 correspond to FIGS. 1-5 in the presentation of a three piece fastener according to a second variant of the present invention. For the purpose of clarity of description, additional figure descriptions for each of second variant of FIGS. 8-12 (and related sub-variant FIGS. 13-14), as well as the third variant of FIGS. 15-19 (and related sub-variant of FIGS. 20-21) will be limited to pointing out differences from that previously illustrated and described in the first embodiment. Similar features will remain as previously described or illustrated.

Figure 8:
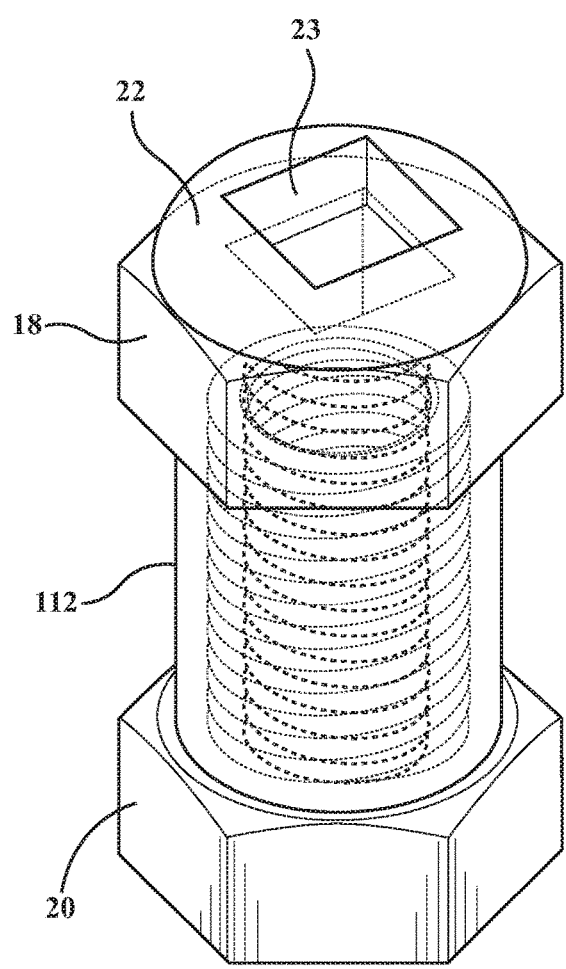
FIG. 8 is an assembled and partially transparent view of a three piece fastener according to a second variant of the present invention.
Figure 9:
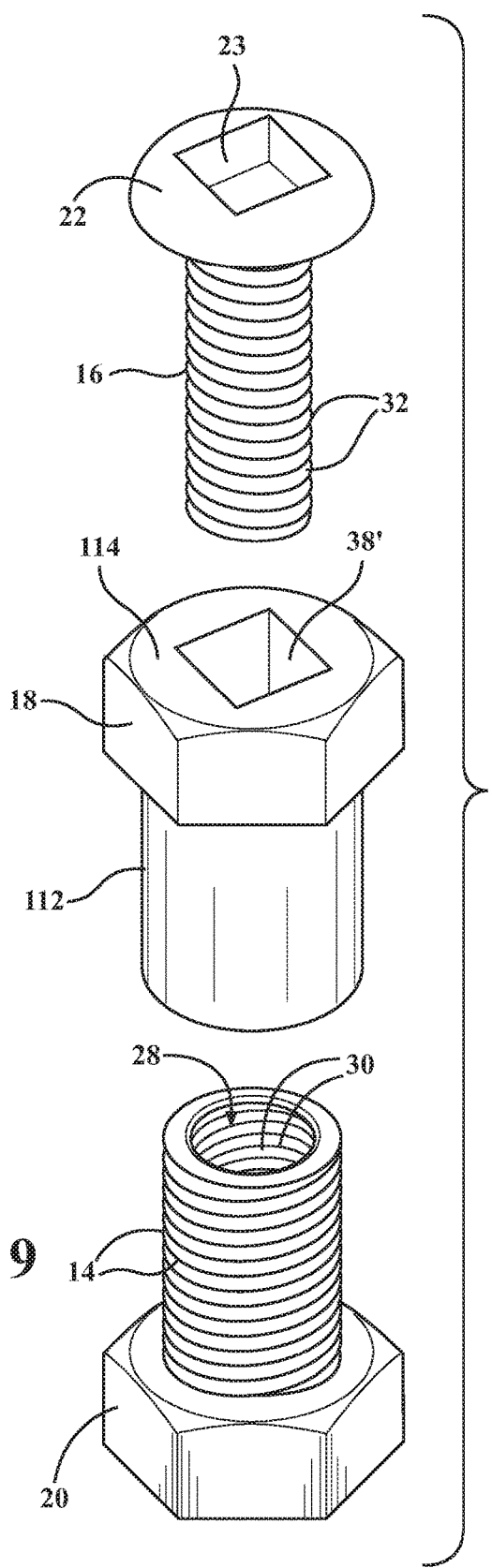
FIG. 9 is an exploded view depicting the three piece fastener of FIG. 8 exhibiting an alternately configured intermediate component with a non-recessed upper end in comparison to that shown in FIG. 1, in combination with a first (bottom) hollow screw and second (top solid screw) exhibiting reverse thread directions.

FIG. 8 is an assembled and partially transparent view of the three piece fastener according to a second variant of the present invention. FIG. 9 is an exploded view depicting the three piece fastener of FIG. 8 and, in differentiation from that shown in FIG. 1, exhibiting an alternately configured intermediate component 112 with a non-recessed upper end surface 114, this depicted in comparison to that shown in FIG. 1, in combination with the first (bottom) hollow screw 14 and second (top) solid screw 16 as previously described and exhibiting the reversed thread directions.

Figure 11:
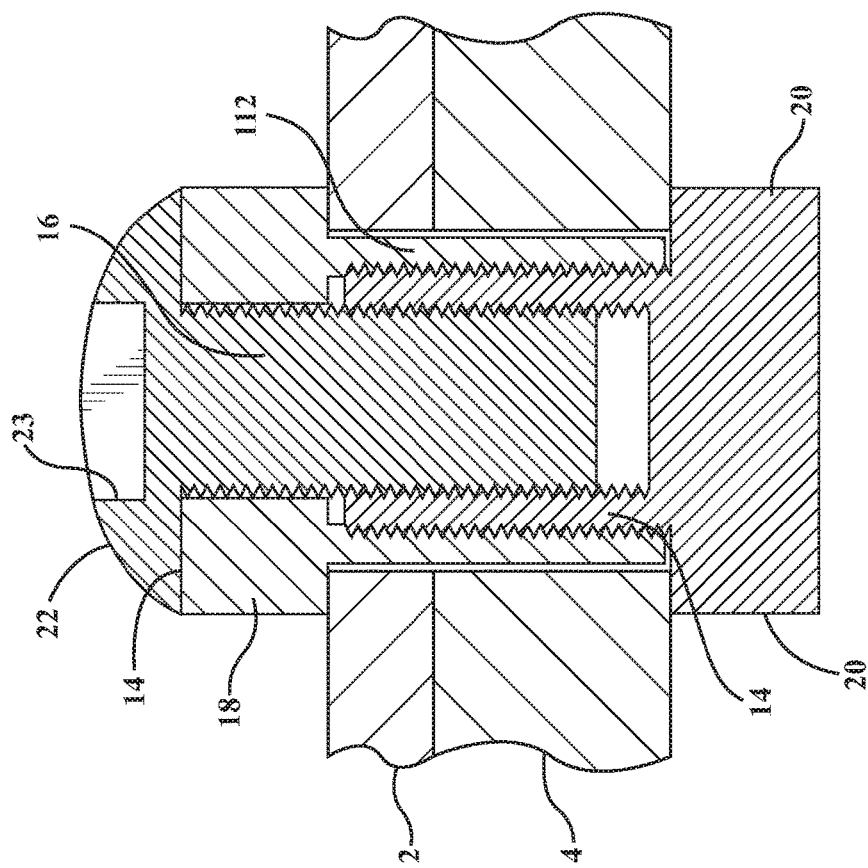
FIG. 11 is an axial cutaway view of the depicting the assembly of FIG. 8.
Figure 10:
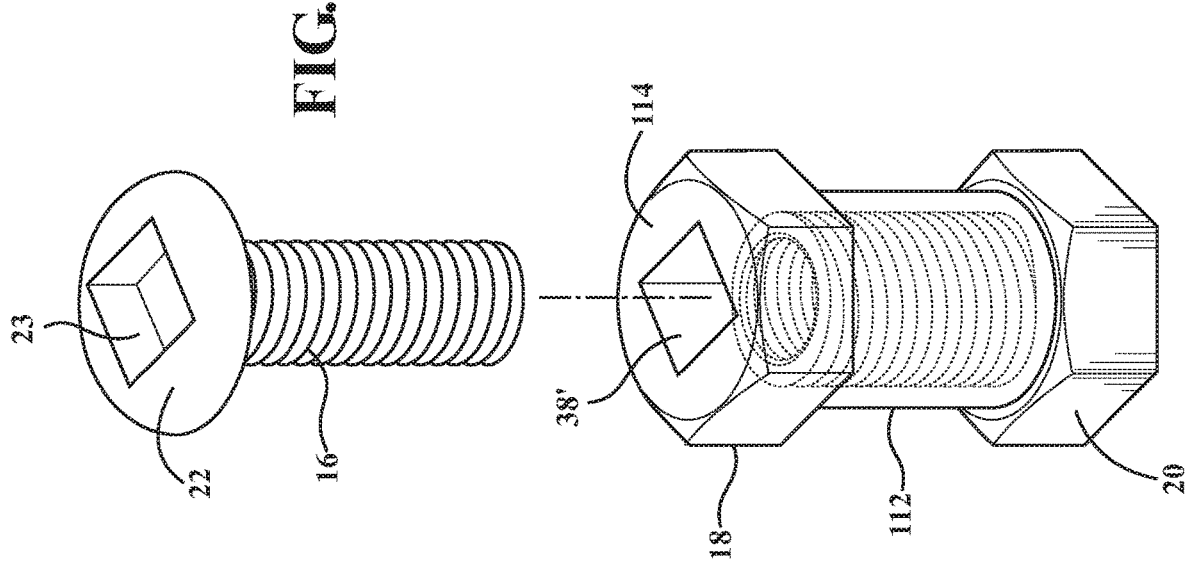
FIG. 10 is a partially exploded view of FIG. 9 and illustrating the lower or first hollowed screw engaged within the lower open and interiorly threaded end of the intermediate component prior to engagement of the upper or second solid screw.

FIG. 10 is a partially exploded view of FIG. 9 and illustrating the lower or first hollowed screw engaged within the lower open and interiorly threaded end of the intermediate component prior to engagement of the upper or second solid screw. FIG. 11 is an axial cutaway view of the depicting the assembly of FIG. 8 and in which the domed or arcuate profile 22 of the upper second screw 16 projects above the upper surface ledge 14 of the intermediate component 112 (and as opposed to being recess seated within the recess profile depicted at the upper end of the intermediate component 12 of FIG. 1 with the underside of the enlarged screw head of the second screw supported upon the undercut ledge 32 in FIG. 1).

Figure 12:
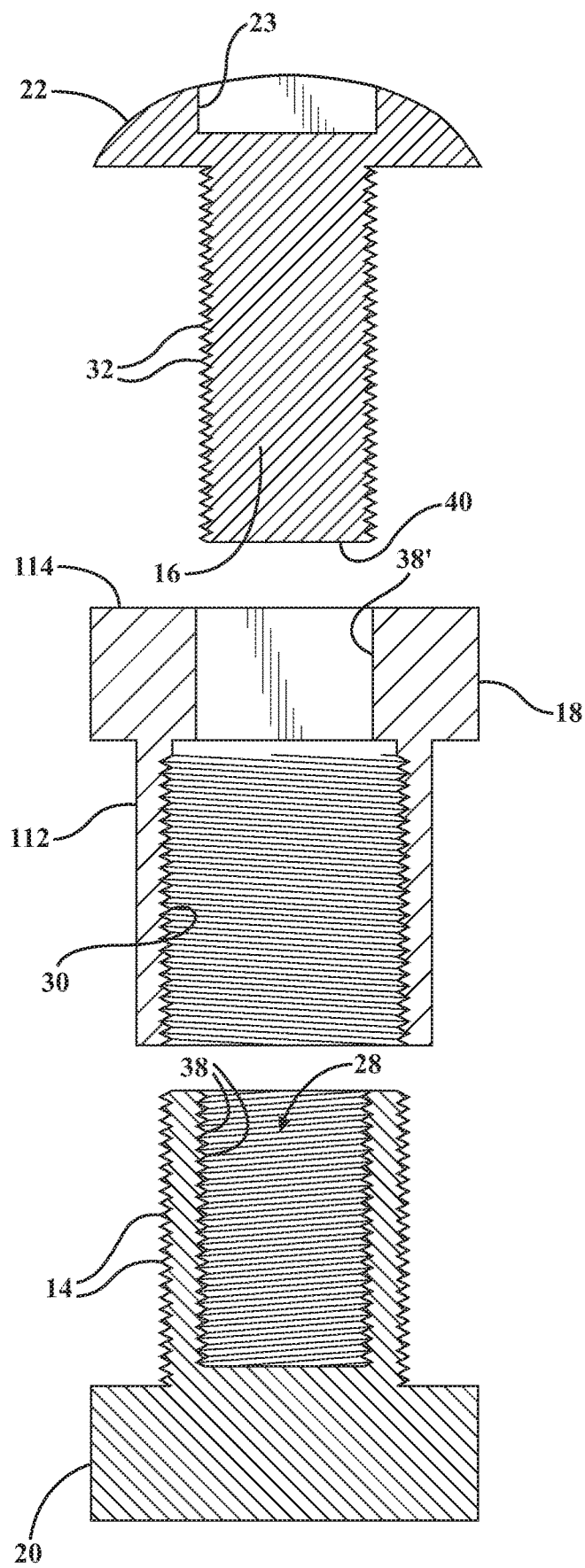
FIG. 12 is an exploded axial cutaway view corresponding to FIG. 9.

FIG. 12 is an exploded axial cutaway view corresponding to FIG. 9, with FIG. 13 depicting is an assembled and partially transparent view of a three-piece fastener as substantially shown in FIG. 8 with the direction of the first and second screw threads being reversed. A square perimeter opening 38' is referenced in the intermediate component 112 which corresponds to that shown at 38 in FIGS. 2 and 5, however is relocated more proximate the upper surface 114 of the intermediate component 112. As with the first embodiment, the dimensions of the reduced dimension square profile enable inserting passage there-through of the threaded stem or shaft 40 of the upper screw 16 (see also again FIG. 11). FIG. 14 is an exploded view depicting the three piece fastener of FIG. 9, again with the intermediate component 112 and first (bottom) hollow screw and second (top solid screw) and reverse thread patterns (see also FIGS. 6-7) exhibited on the top and bottom screws and in the same manner previously described.

FIG. 15 is an illustration similar to previous FIGS. 1 and 8 of an assembled and partially transparent view of a three-piece fastener according to a third variant of the present invention. FIG. 16 is an exploded view depicting the three-piece fastener of FIG. 15 with the intermediate component 112 and first (bottom) hollow screw 14 as depicted in FIG. 9, the second (top) solid screw being alternately configured from that shown at 16 in FIG. 9, and as further shown at 116 in FIG. 16. In particular, the domed head 22 of the second screw 116 is reconfigured in this variant as a hex head 122 with a flat upper surface within which is configured the tool bit engaging square recess pattern 23' reconfigured within the hex head 122.

Figure 18:
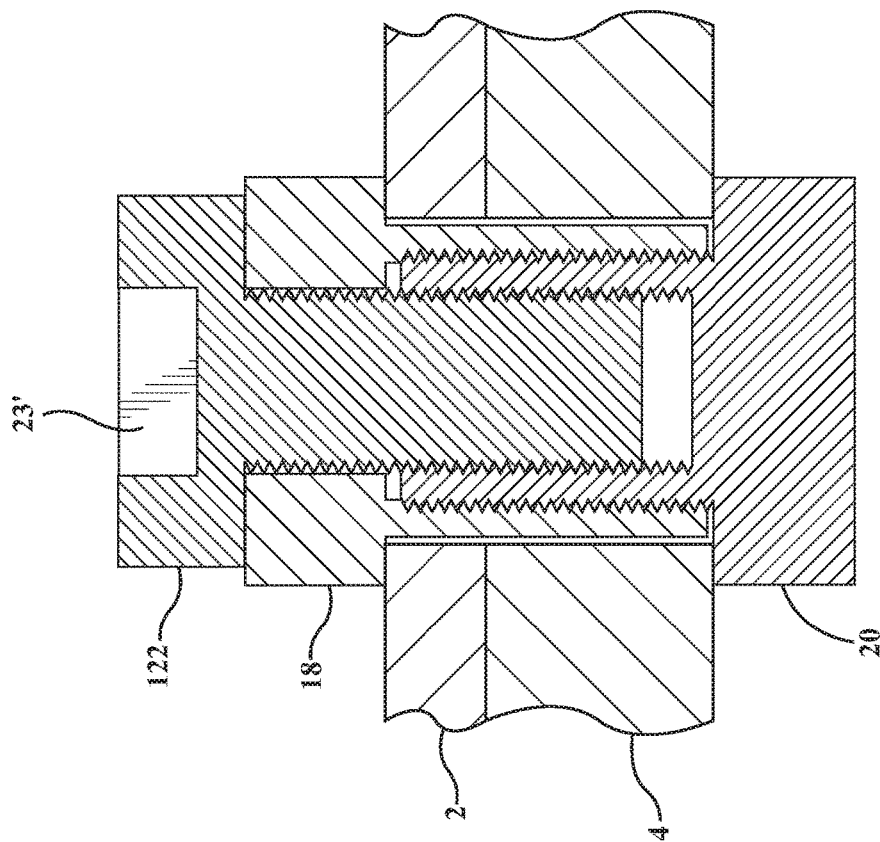
FIG. 18 is an axial cutaway view depicting the assembly of FIG. 15.
Figure 17:
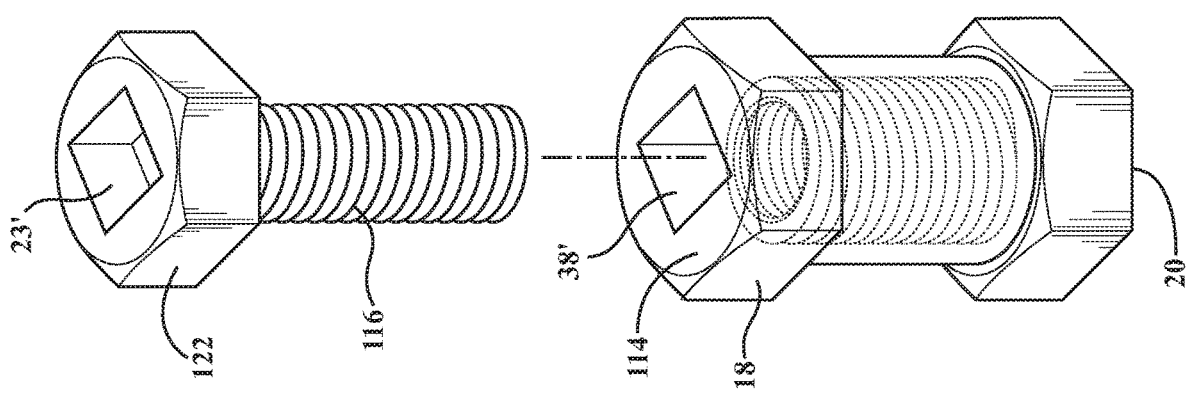
FIG. 17 is a partially exploded view of FIG. 15 and illustrating the lower or first hollowed screw engaged within the lower open and interiorly threaded end of the intermediate component prior to engagement of the upper or second solid screw.
Figure 19:
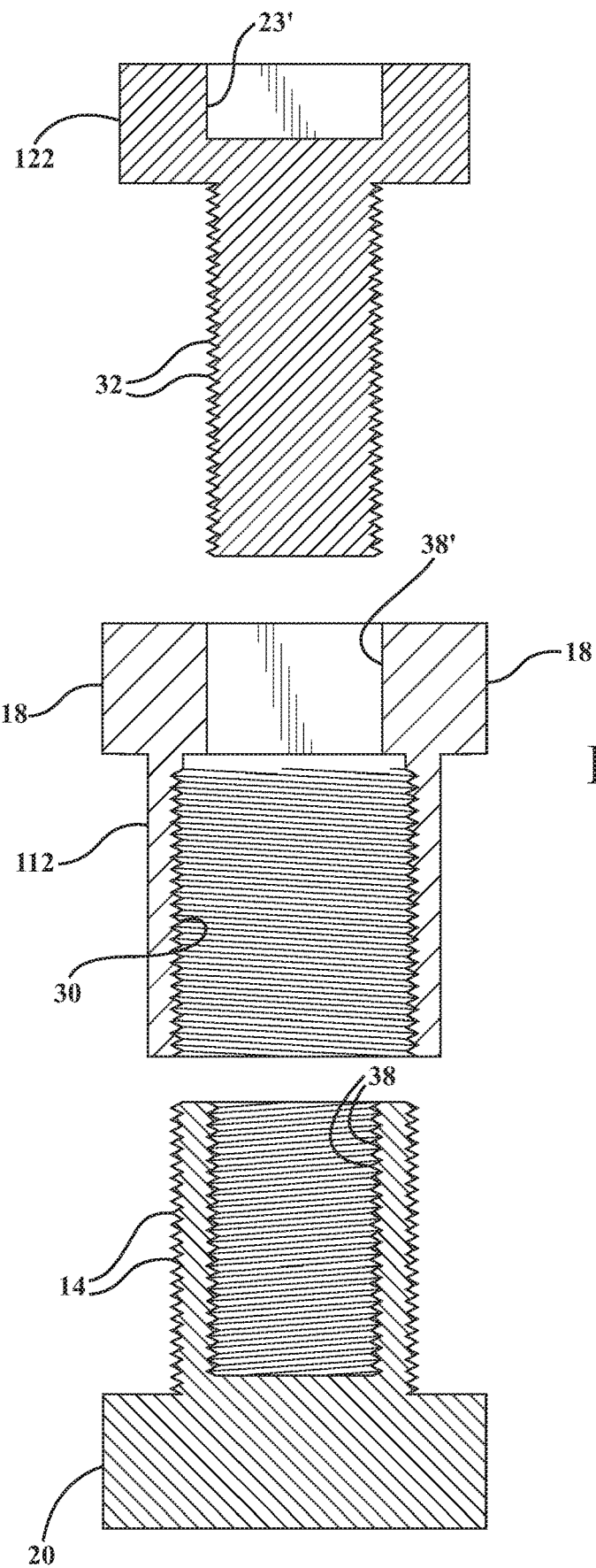
FIG. 19 is an exploded axial cutaway view corresponding to FIG. 16.

FIG. 17 is a partially exploded view of FIG. 15 and illustrating the lower or first hollowed screw 14 engaged within the lower open and interiorly threaded end of the intermediate component 112 prior to engagement of the upper or second solid hex head screw 122. FIG. 18 is an axial cutaway view of the depicting the assembly of FIG. 15, with FIG. 19 providing an exploded axial cutaway view corresponding to FIG. 16.

Figures 20, 21:
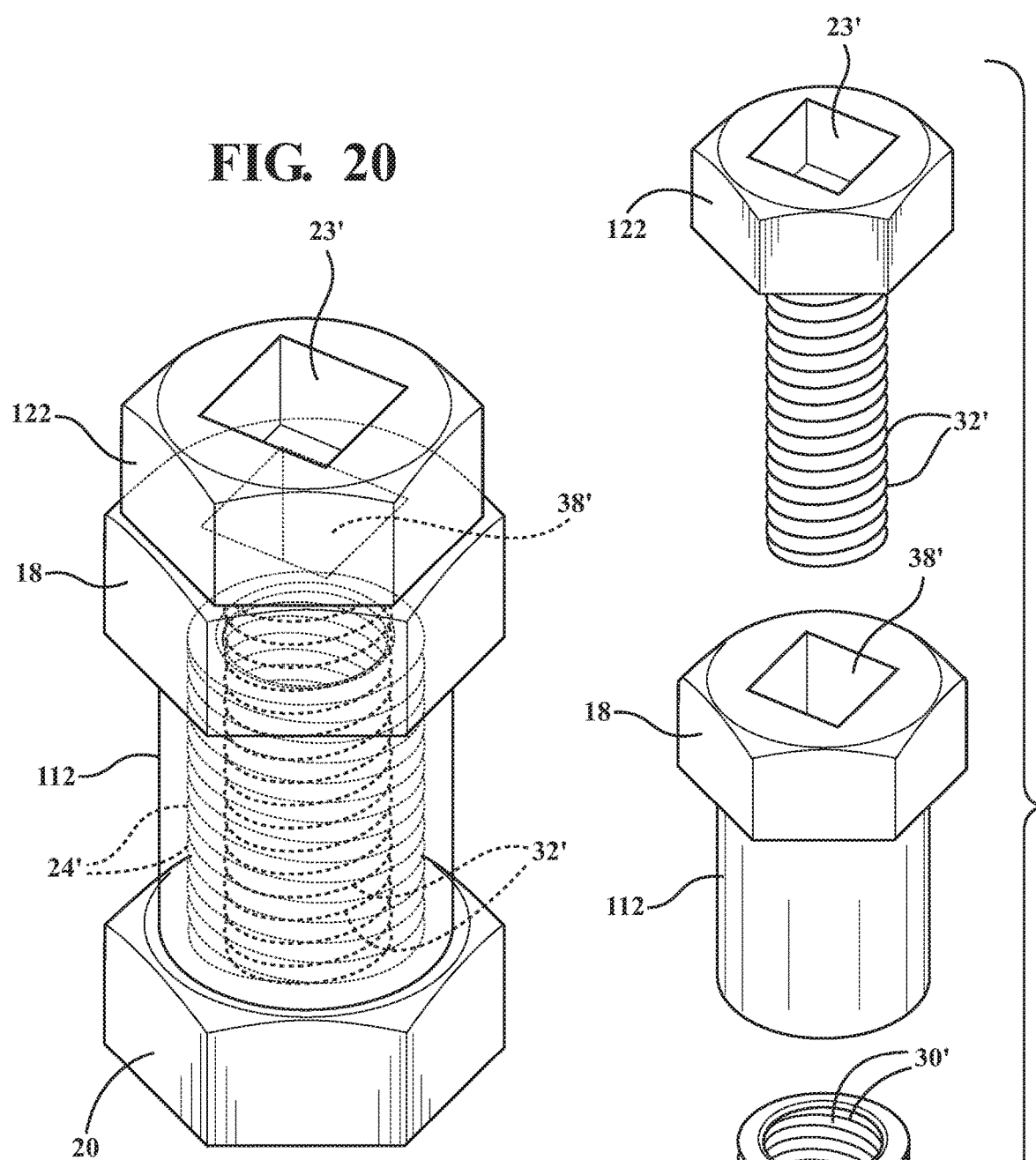
FIG. 20 is an assembled and partially transparent view of a three piece fastener as substantially shown in FIG. 15 with the direction of the first and second screw threads being reversed.
FIG. 21 is an exploded view depicting the three piece fastener of FIG. 20, similar to that previously shown in FIG. 16 and again with the intermediate component and first (bottom) hollow screw and second (top solid screw) with reversed thread patterns.

FIG. 20 is an assembled and partially transparent view of a three piece fastener as substantially shown in FIG. 15 with the direction of the first and second screw threads being reversed, this further depicted in the exploded view of FIG. 21 with reversed thread patterns as previously shown in corresponding FIG. 7 (first variant) and FIG. 14 (second variant).

Figure 22:
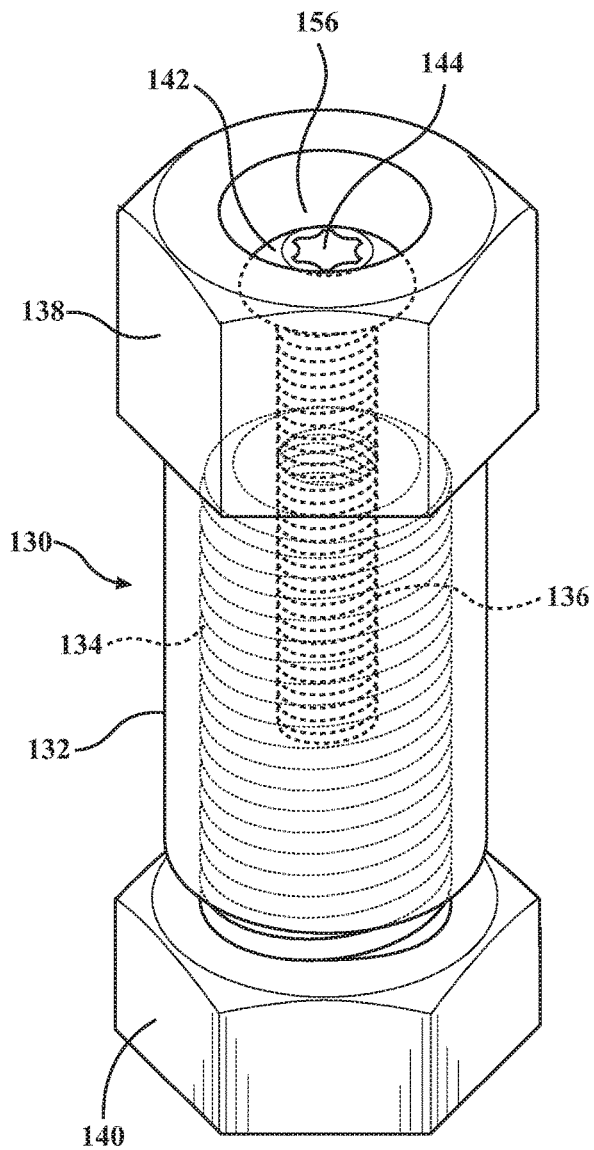
FIG. 22 is an assembled and partially transparent view of a three piece fastener according to a further embodiment of the present invention.
Figure 23:
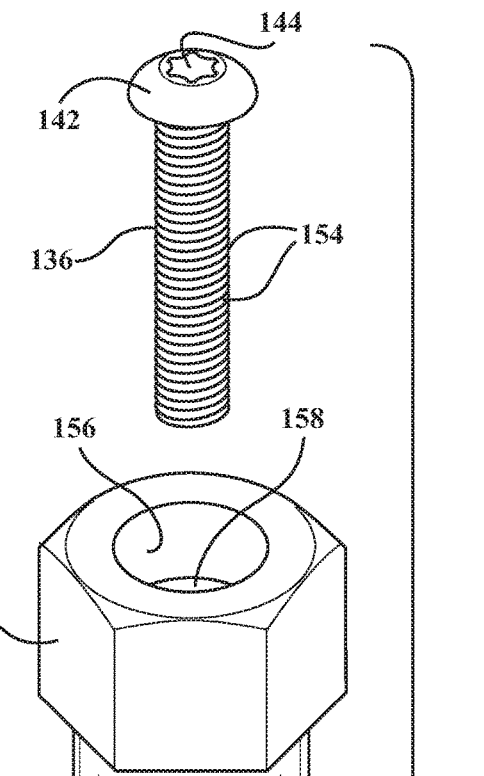
FIG. 23 is an exploded view depicting the three piece fastener of FIG. 22.
Figure 23:
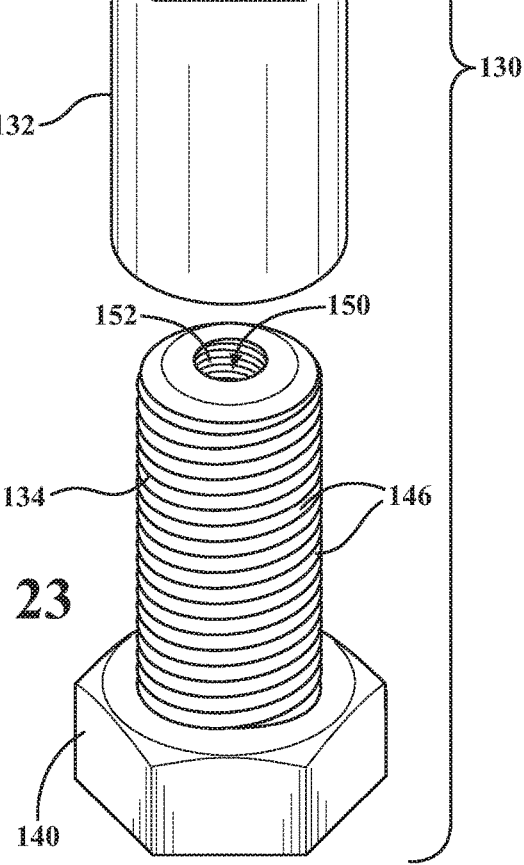

Referring now to FIG. 22, an assembled and partially transparent view is generally shown at 130 of a three-piece fastener according to a further embodiment of the present invention. As additionally shown in the exploding and axial cutaway views in succeeding FIGS. 23-25, the three-piece fastener includes intermediate component 132 and first (bottom) hollow screw 134 and second (top) solid screw 136.

As with the preceding variant, the intermediate component 132 and first 134 and second 136 fasteners can be constructed of any rigid material not limited to steel, carbon steel or any durable composite (e.g. nylon or polymer) material. As further understood, the screws 134 and 136 are also commonly termed as "threaded bolts" however can include any other suitable configuration for inter-engaging with the intermediate component 132 in the manner described herein.

Figure 24:
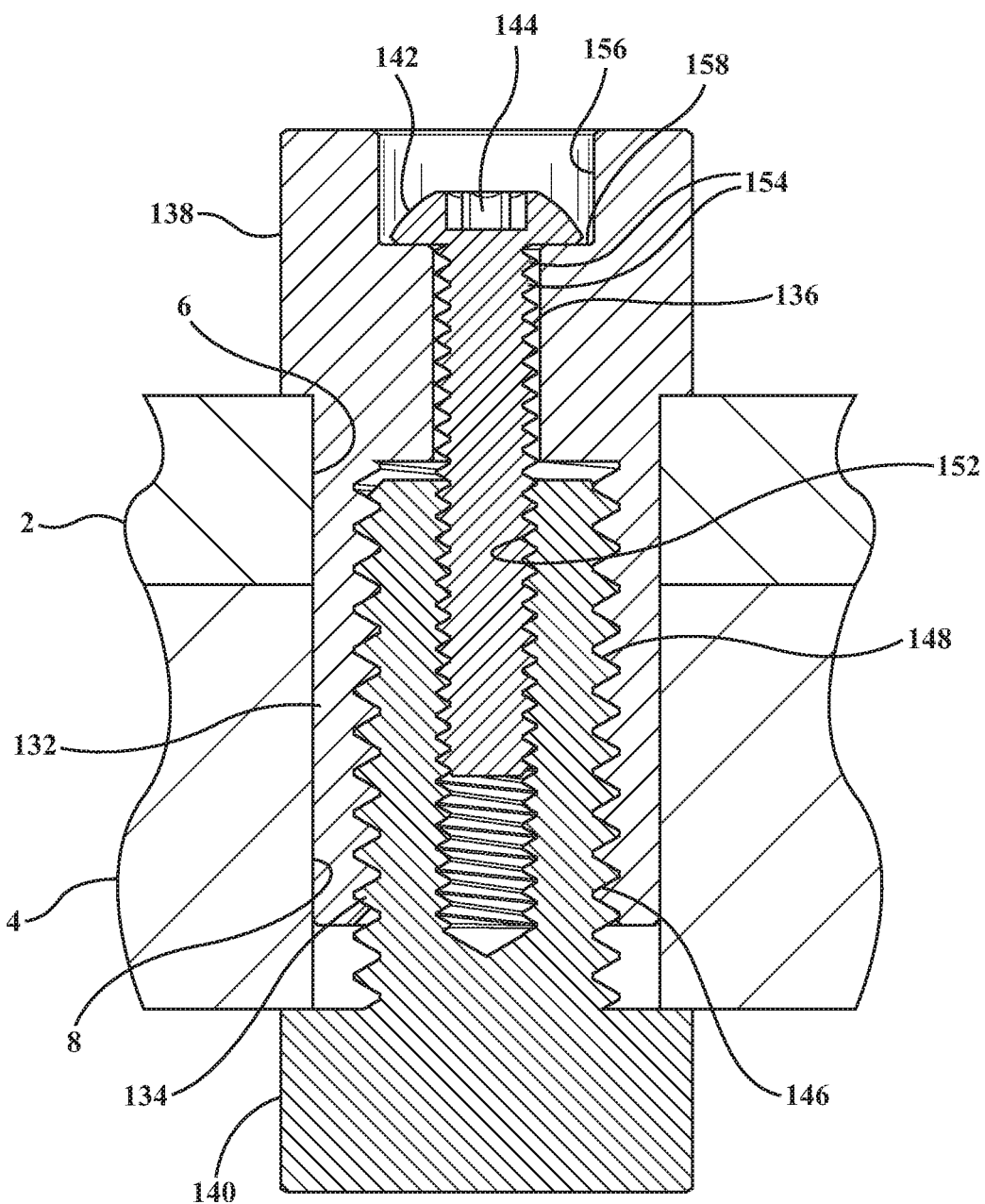
FIG. 24 is an axial cutaway view depicting the assembly of FIG. 22.
Figure 25:
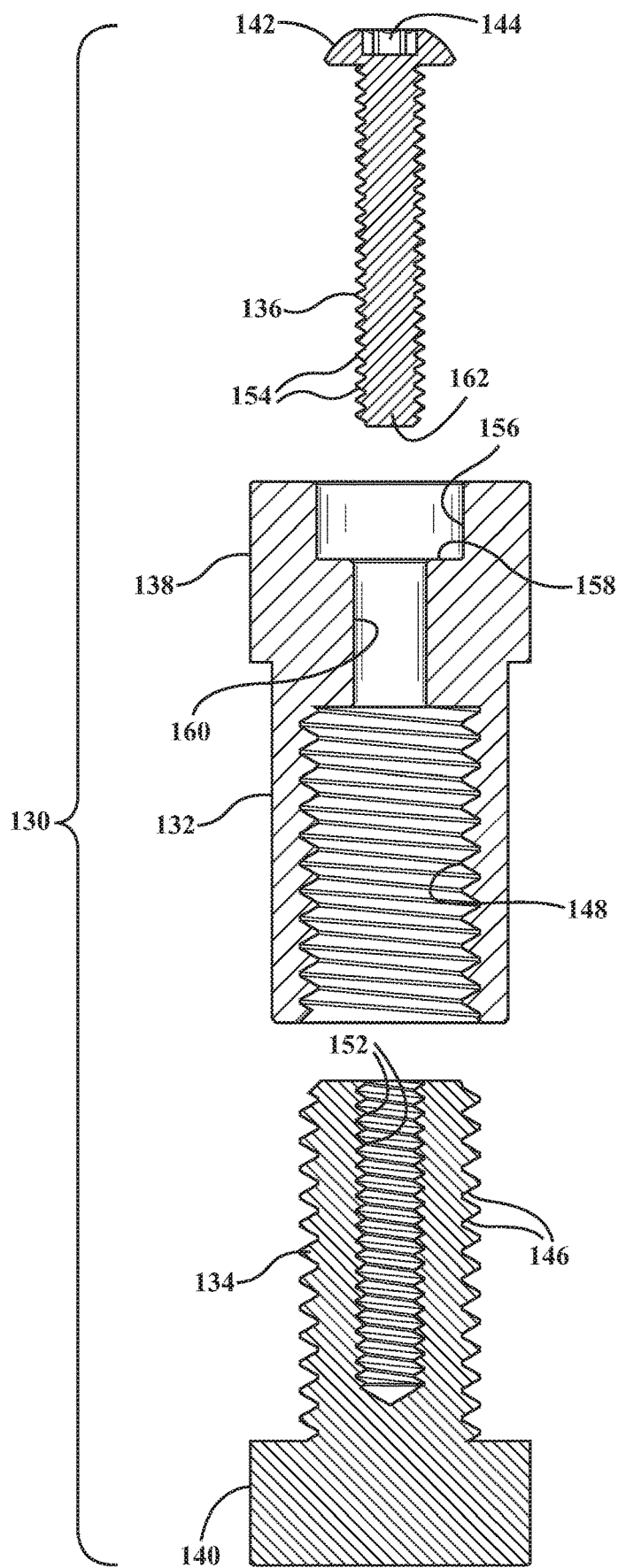
FIG. 25 is an axial cutaway of the exploded view of FIG. 23.

FIG. 24 provides an axial cutaway view depicting the assembly of FIG. 22 and further showing the first 2 and second 4 layers (see also FIG. 4) being secured together, each having aligning apertures again depicted by inner perimeter surfaces 6 and 8, respectively, and through which the stem portion (again at 132) of the intermediate component extends. FIG. 25 further provides is an exploded axial cutaway view corresponding to FIG. 23 of the three-piece fastener 130.

As previously described, the layers 2 and 4 are generally represented and can include any configuration or application not limited in one potential application to such as an attachment fastener for a skate blade to a flange, bracket or other support surface. As also previously described, and in a further application, the layers 2 and 4 can correspond to an inner rim or wheel supporting a tire in attachment to a wheel hub such that the present invention serves to provide a durable fastener arrangement which resists loosening in response to vibrations and the like, such as which can be typical of dynamic operating environments.

The intermediate component 132 includes an enlarged polygonal shaped head, such as which is depicted as a hex head configuration at 138, which is shown proximate its upper open end. At least one of the selected screws 134/136 (also again termed bolt threads) likewise include an enlarged hex head which is depicted in FIG. 22 by hex head 140 associated with the lower or first bolt 134. As further again shown in FIG. 24, the opposing inner ledge surfaces created by the enlarged hex heads 138 and 140 provide the sandwiching force to the proximate aperture surface perimeter locations of the layers 2/4 in the environmental illustration shown. Without limitation, the hex head can again be substituted by any other multi-sided polygonal shape head, not limited to any of a triangular, square, pentagonal or other shape exhibiting a number of interconnected sides, and it is also again envisioned that the polygonal shaped enlarged heads can be reconfigured in other shapes consistent with the use of any tightening or loosening tool.

The upper or second screw 136 includes a curved and enlarged diameter head 142. A tool bit engageable recess (see as including a star profile 144 also known as a Torx style screw by non-limiting example) is formed in the enlarged head 142 to facilitate engagement by a tool bit (not shown) for securing the second (top) screw 136 following pre-threaded engagement of the exterior threads (at 146) of the lower screw 134 within the interior threads (best shown at 148 in FIG. 25) of the intermediate component 132.

As further shown, the first screw 132 includes a hollow shaft (see generally at 150 in FIG. 23) exhibiting a further plurality of interior threads (further at 152) matching a direction of the first thread pattern 146. In comparison, the second screw 136 exhibits a second exterior thread pattern 154 which is opposite the first pattern and, upon being installed within the other selected one of the opposite ends (depicted as the upper end of the intermediate component 132), results in rotationally inter-engaging of the thread pattern 154 with the opposing interior thread pattern 152 of the first screw 134, with loosening of either of the first 134 and second 136 screws being prevented by virtue of their counter-threaded orientation.

Additional features include the intermediate component 132 exhibiting an upper end proximate undercut recess, see annular inner rim surface 156 communicated with undercut ledge 158, this for receiving and seating the enlarged head 142 of the second fastener 136 in the shown in FIGS. 22 and 24. A circular inner perimeter (see at 160) is configured in the undercut recess for communicating the solid extending stem (at 162) of the second fastener 136 within the open interior of the intermediate component 132 and into engagement with the hollow threaded interior 150 of the previously installed first fastener 134 according to the previously described counter-threaded and loosening preventative manner.

Figure 26:
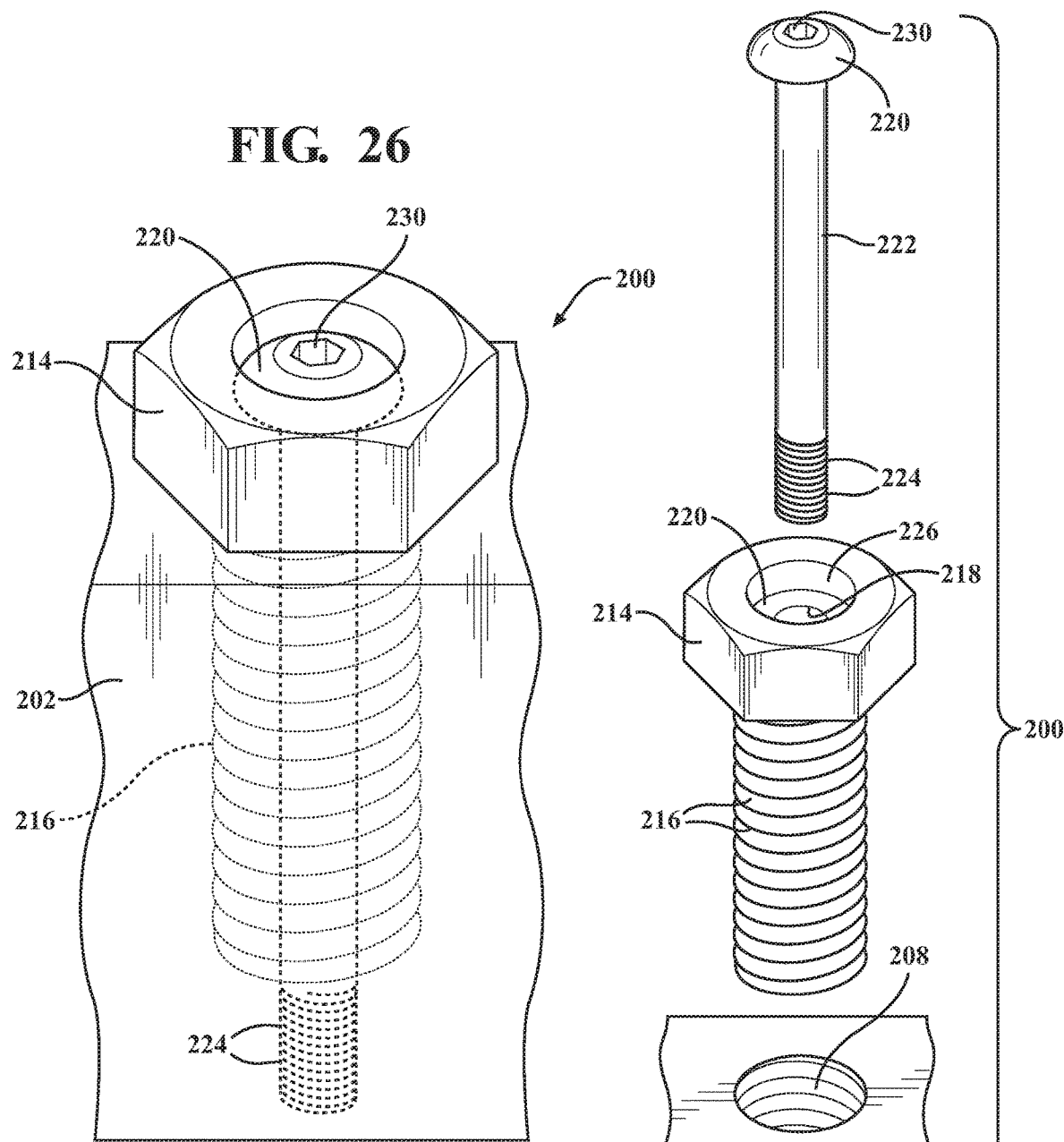
FIG. 26 is an assembled and partially transparent view of a multi-piece fastener according to a further embodiment of the present invention.
Figure 27:
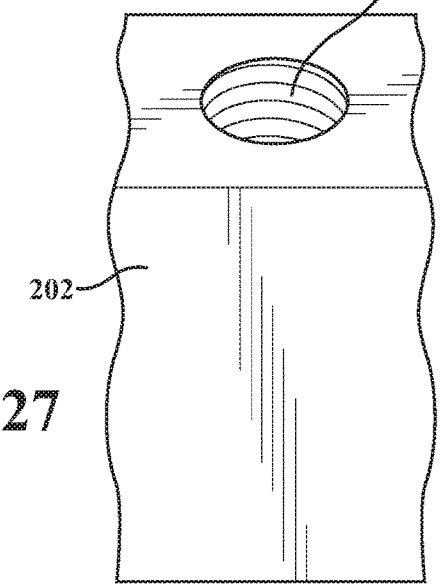
FIG. 27 is an exploded view of the multi-piece fastener of FIG. 26 and depicting each of a thickened base layer with first and second successive and counter threaded interior profiles, a first wider diameter bolt style fastener and second interiorly seating and narrower diameter bolt style fastener.
Figure 34:
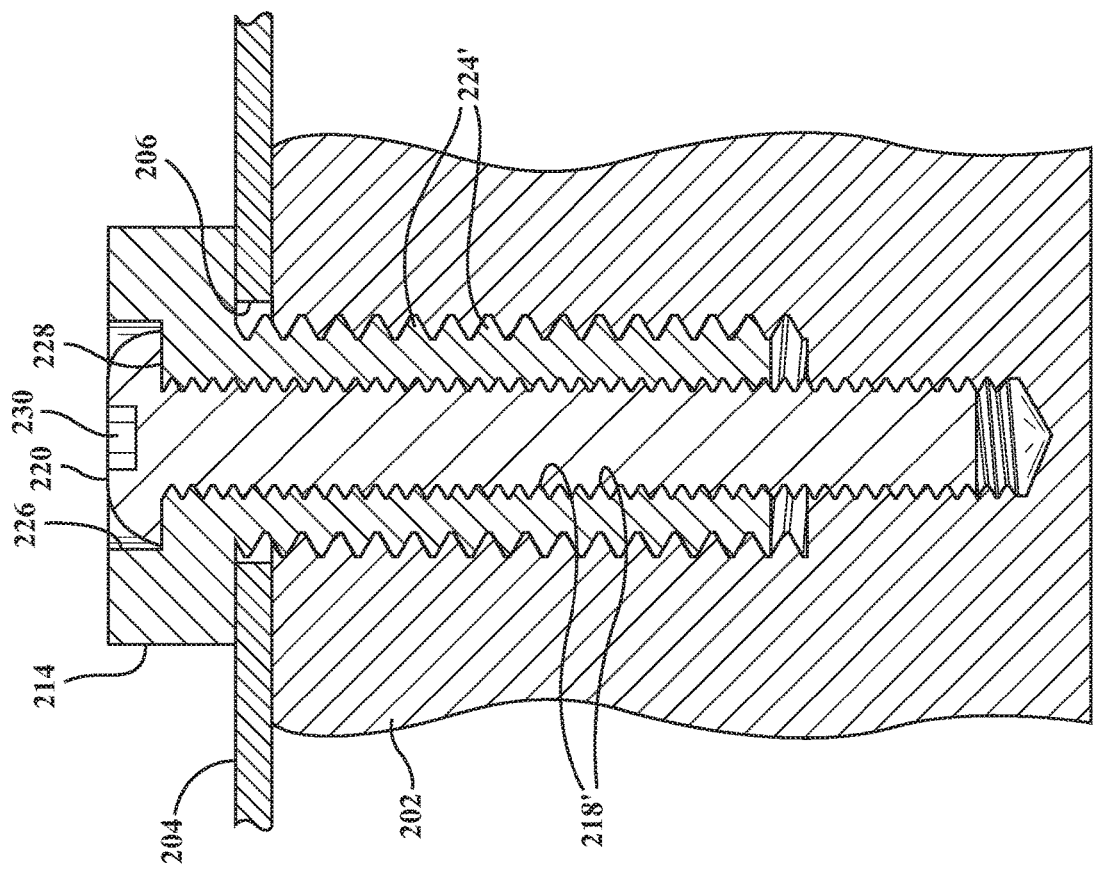
FIG. 34 is an axial cutaway depicting the exploded assembly of FIG. 31.
Figure 33:
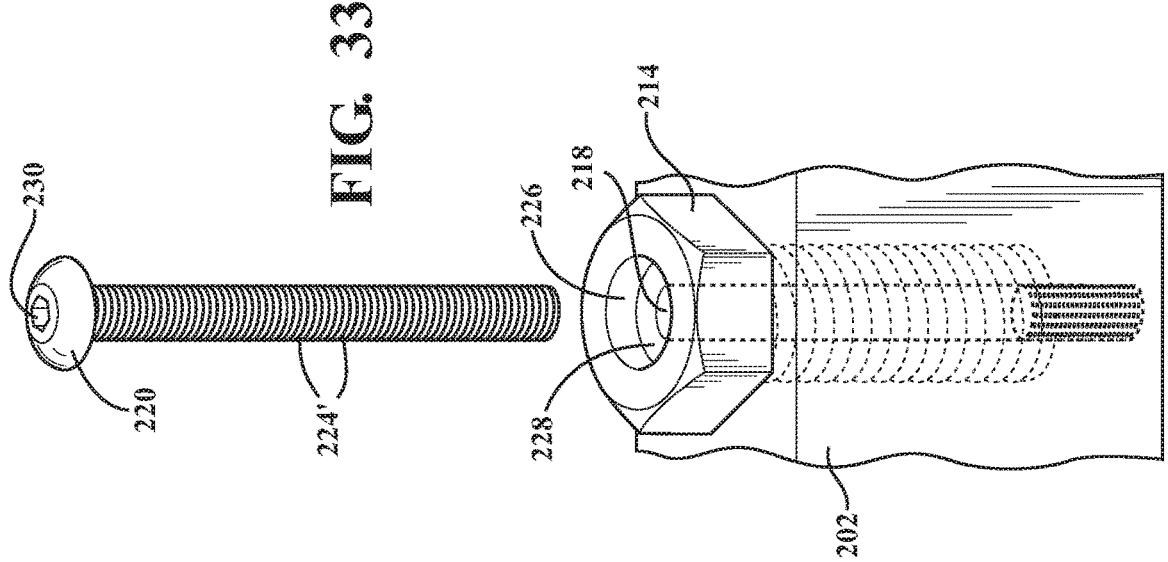
FIG. 33 is a succeeding illustration to FIG. 32 and depicting the wider diameter fastener installed within the base layer in a preliminary assembly step.

Proceeding to FIGS. 26 and 27, a first assembled and partially transparent view and a second exploded view respectively are generally shown at 200 of a multi-piece fastener assembly according to a further embodiment of the present invention. A base layer 202 forms part of the fastener assembly and, along with the first and second elongated fasteners to be further described, includes without limitation any of steel, other metal (e.g. aluminum or the like) or other rigid material further including but not limited to a heavy duty nylon or other material which would avoid stripping of its threaded interfaces in response to forces exerted upon the fastener assembly. The base layer 202 is further contemplated to exhibit a sufficient depth dimension as required for receiving the first and second bolt style fasteners as will be further described and to secure such as a second thinner surface layer, see at 204 in FIGS. 29 and 34 and such as which can further include an inner rim 206 defining aperture sized for receiving the diameter of the stem associated with the first bolt fastener.

Figure 29:
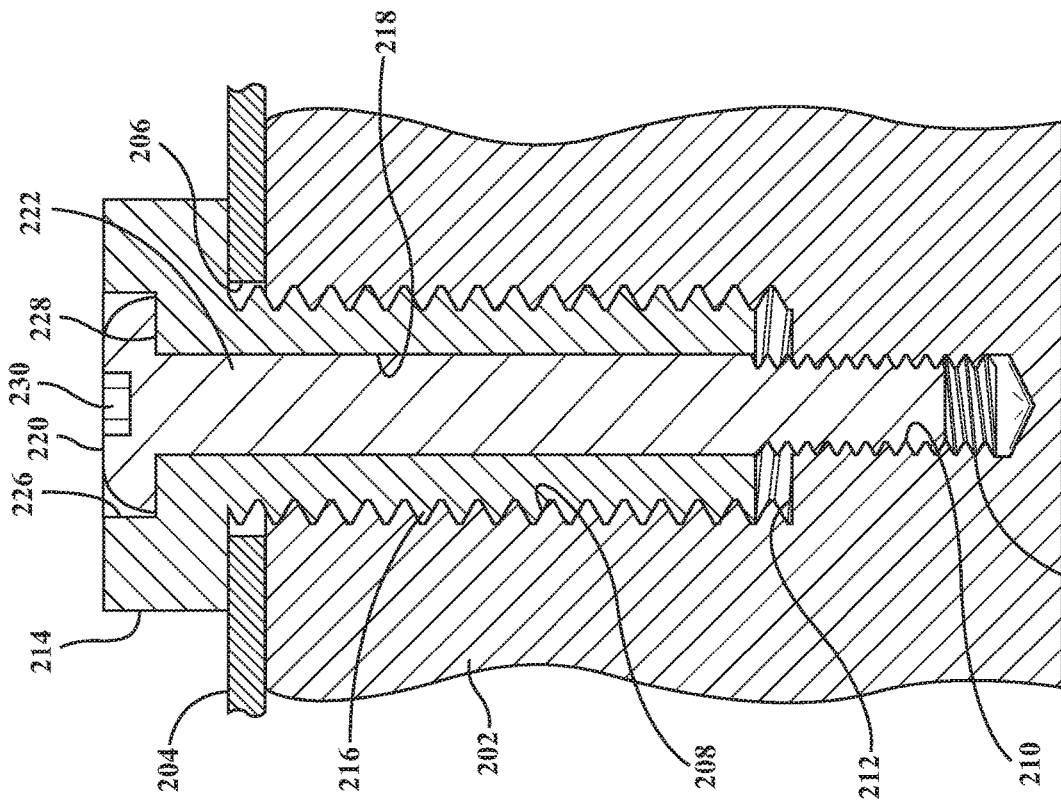
FIG. 29 is an axial cutaway depicting the exploded assembly of FIG. 26.
Figure 28:
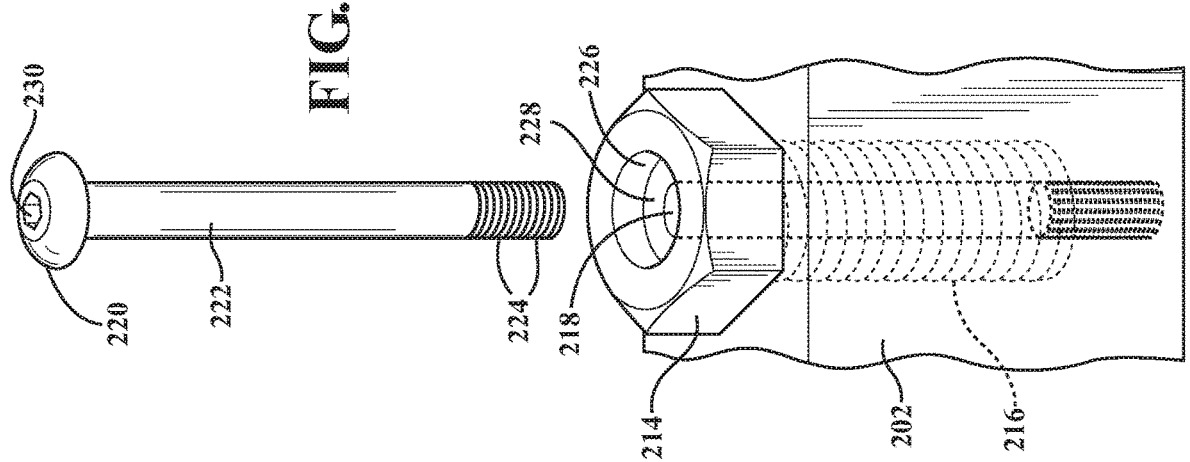
FIG. 28 is a succeeding illustration to FIG. 27 and depicting the wider diameter fastener installed within the base layer in a preliminary assembly step.
Figure 30:
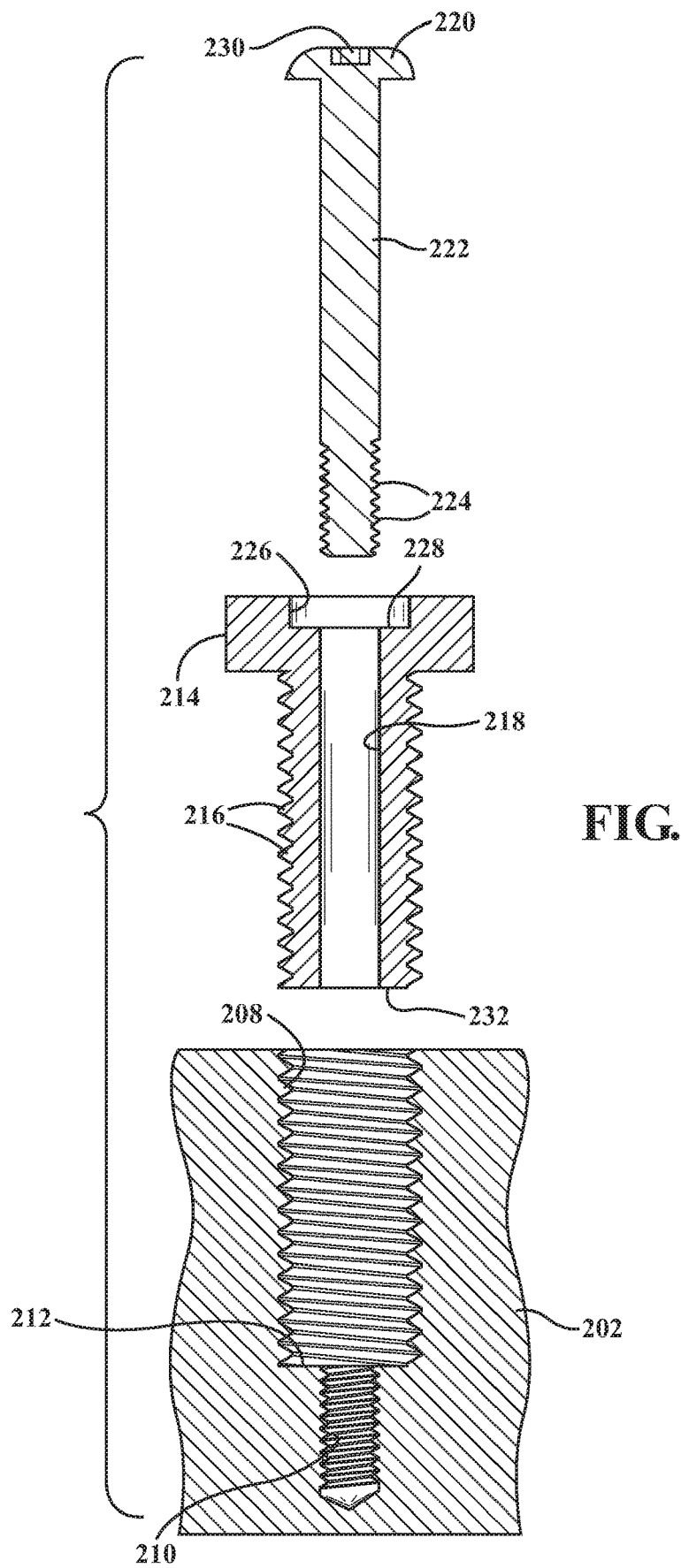
FIG. 30 is an axial cutaway depicting the assembly of FIG. 27.

The base layer 202 is configured with a first wider diameter and interior rim edge defining passageway which exhibits a first interiorly threaded orientation 208 (see FIGS. 27, 29 and 30). A second narrower diameter passageway exhibits a second opposite threaded orientation 210 (see as best shown in FIGS. 29-30) and extends a selected distance in communication with and beyond a bottom end wall 212 of the first wider passageway 208.

Figure 35:
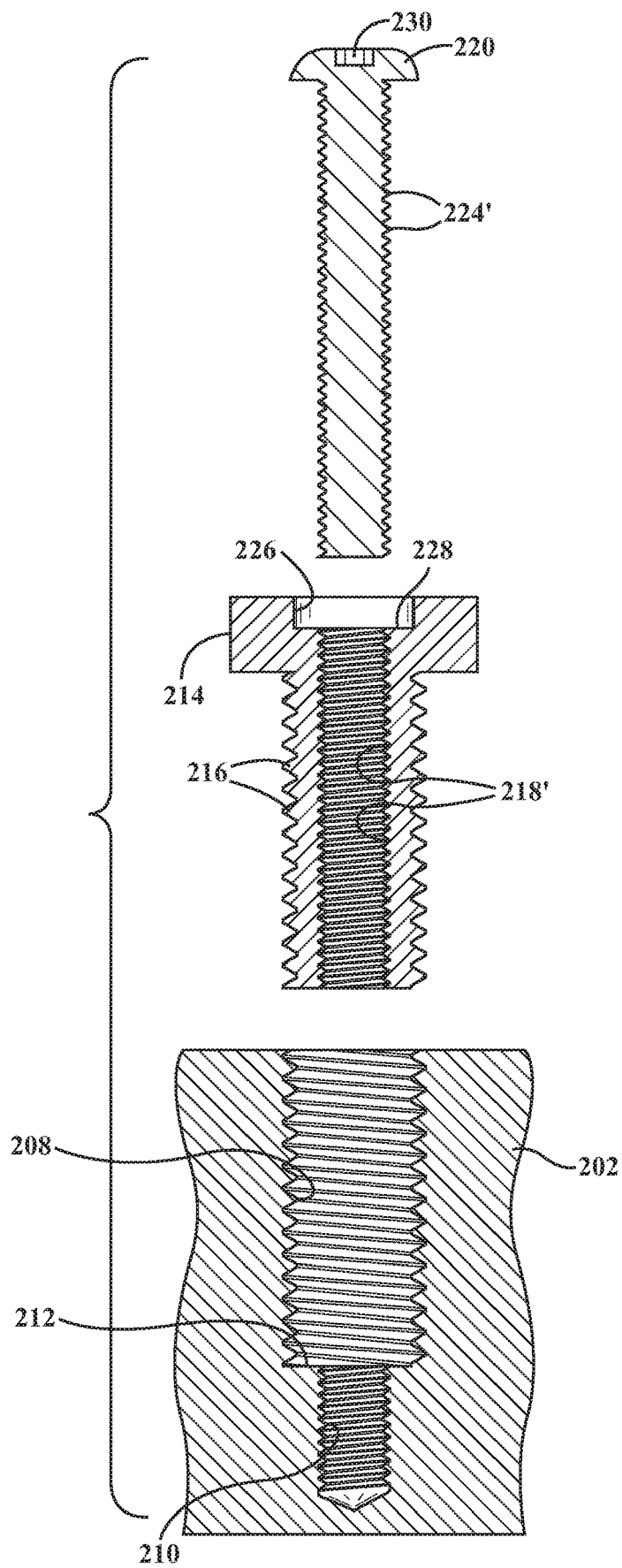
FIG. 35 is an axial cutaway depicting the assembly of FIG. 32.

A first redesigned elongated and wider diameter bolt style fastener includes an enlarged head 214, such as which can be provided as a hex head configuration and which upon being installed compresses the second layer 204 against the first base layer 202 (again FIG. 29). The wider diameter bolt style fastener also includes an integrally formed stem having a first arrangement of exterior threads 216 which are threadably inter-engageable with the interior rim edge oriented threads 208 configured within the wider diameter passageway of the base layer 202. The first fastener further includes a further interior passageway (see as best shown in axial cutaway of FIG. 30 by inner rim defining wall 218 extending the axial length of the head 214 and threaded stem 216. As further shown, the interior passageway 218 can be a smooth surface (with further reference to the alternate variant in FIG. 35 such alternately exhibiting counter oriented threads and which can be optionally threaded along any of a partial or entire length in a counter direction relative to the exterior threads 216).

A second narrower diameter bolt style fastener includes a head 222 (depicted as rounded) and an extending stem 222 which can be partially or fully threaded, see at 224 along end-most portion of the stem 222. A recessed or annular undercut is provided in the upper surface of the enlarged head 214 of the wider bolt (see as shown by annular recessed side rim 226 and interconnected recessed end wall 228 which are dimensioned to seat the head 220 of the inner diameter fastener in a substantially flush manner). The inner diameter fastener head 220 further includes a bit receiving upper end recess (see profile 230) which can include without limitation a configuration for receiving a standard Allen style wrench (not shown).

Following the wider diameter fastener being installed into the base layer 202 to secure there-against the second and typically thinner layer 204 (see again FIG. 29), the second fastener stem 222 is dimensioned to be installed through the interior passageway 218. Upon being fully installed, the threaded 224 end most portion of the inner fastener stem 222 projects beyond a stem end face 232 (see as best shown in FIG. 30) of the wider fastener and abutting end wall 212 of the wider interior passageway configured within the base layer 202, with the threaded narrowed stem portion 224 threadably inter-engaged with the further extended counter oriented threads 210 defining the progressing second narrower diameter passageway. In this manner, loosening of either the opposing coaxial seating outer wider and inner narrowed bolt fasteners is prevented via their counter-threaded orientations.

Figure 31:
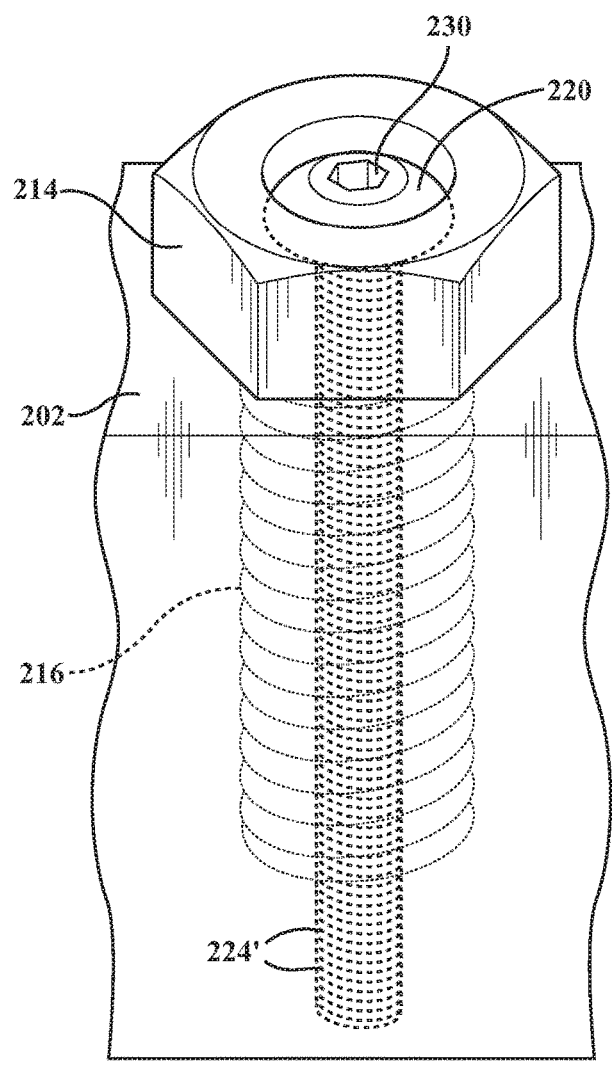
FIG. 31 is an assembled and partially transparent view of a multi-piece fastener according to a sub-variant of the further embodiment of FIG. 26.
Figure 32:
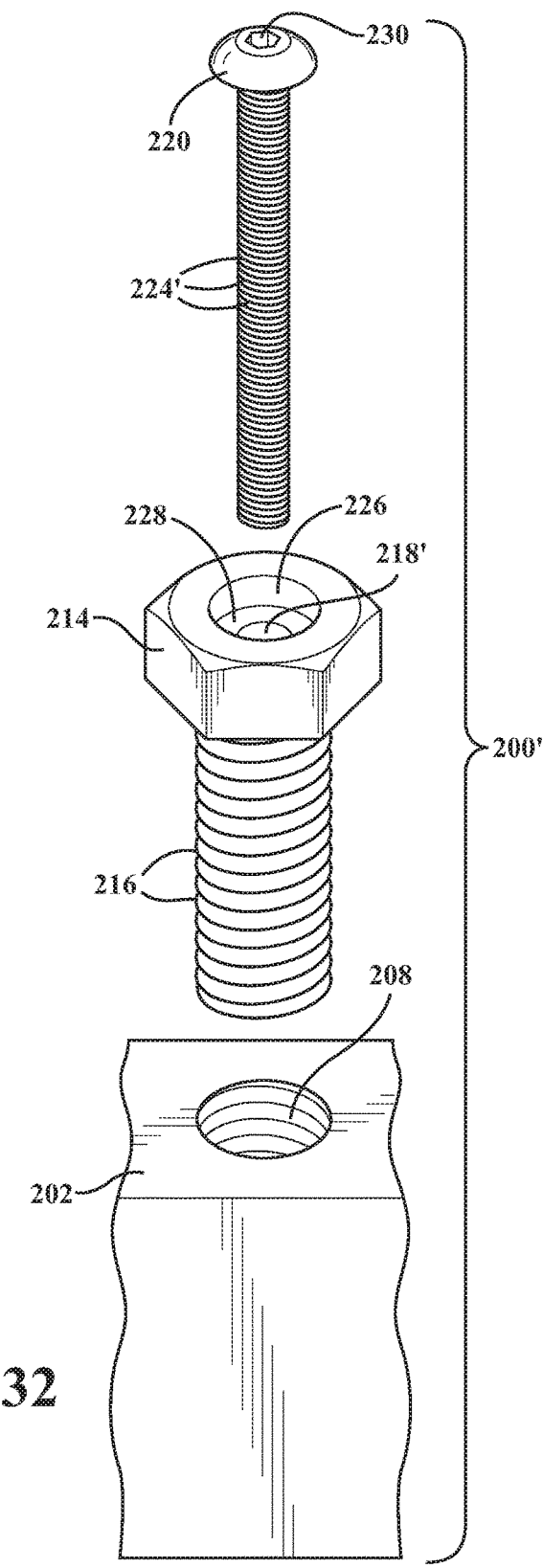
FIG. 32 is an exploded view of the multi-piece fastener of FIG. 31 and depicting each of a thickened base layer with first and second successive and counter threaded interior profiles, a first wider diameter bolt style fastener and second interiorly seating and narrower diameter bolt style fastener, the narrow diameter bolt including an exteriorly threaded stem in comparison to the non-threaded stem of the inner diameter bolt shown in FIG. 27.

FIGS. 31 and 32 present each of a first assembled and partially transparent view and a second exploded view respectively at 200' of a multi-piece fastener according to a sub-variant of the embodiment 200 of FIGS. 26-30. Identical features to that shown in FIGS. 26-30 are repetitively numbered without further explanation.

In comparison to the prior version 200 the variant 200' depicts a reconfiguration of the wider and narrow diameter bolt fasteners such that the wider fastener exhibits a threaded interior passageway 218' (see FIGS. 34-35) this in comparison to the smooth edged rim defining passageway 218 shown previously in FIGS. 29-30. The second narrowed diameter bolt fastener further exhibits a reconfiguration of the counter oriented exterior threads 224' extending along an entire length of the stem (compare at 222 in FIG. 27 with only partial end most disposed threads 224).

The interior passageway defined thread pattern 218' of the wider fastener is configured to receive the reconfigured exterior threads 224' prior to successive inter-engagement of the lower end-most threaded portion 224' of the inner diameter bolt fastener with the inner diameter end-most extending and likewise counter oriented threads 210, these again configured in the base layer 202 beyond the first outer threaded orientation 208 and interconnecting bottom end wall 212 and which are in a same orientation as the exterior threads 224' reconfigured upon the annular outer profile of the inner diameter bolt fastener. As with the prior variant 200, the inner diameter bolt fastener is fully installed with the bottom of the head 220 is seated flush within the undercut recess (side annular wall 226 and bottom recessed wall 228) defined in the larger head 214 of the wider diameter bolt fastener.

The addition of the inter-engaging exterior threads 224' of the inner diameter bolt fastener and opposing interior passageway threads 218' of the outer diameter fastener are intended to provide variable torque resistance values as compared to the variant depicted in FIGS. 26-30. That said, the present invention contemplates any or no degree of threading between the opposing mating profiles established between the inner and outer bolt fasteners, so long as at least an end-most portion of the inner bolt fastener is threaded (as again previously shown at 224 in FIG. 27) for inter-engagement with the threaded profile 210 in the base layer 202 (in turn counter-threaded to the outer diameter profile 208 for receiving the exterior threads 216 of the outer or wider diameter bolt fastener.

Figure 36:
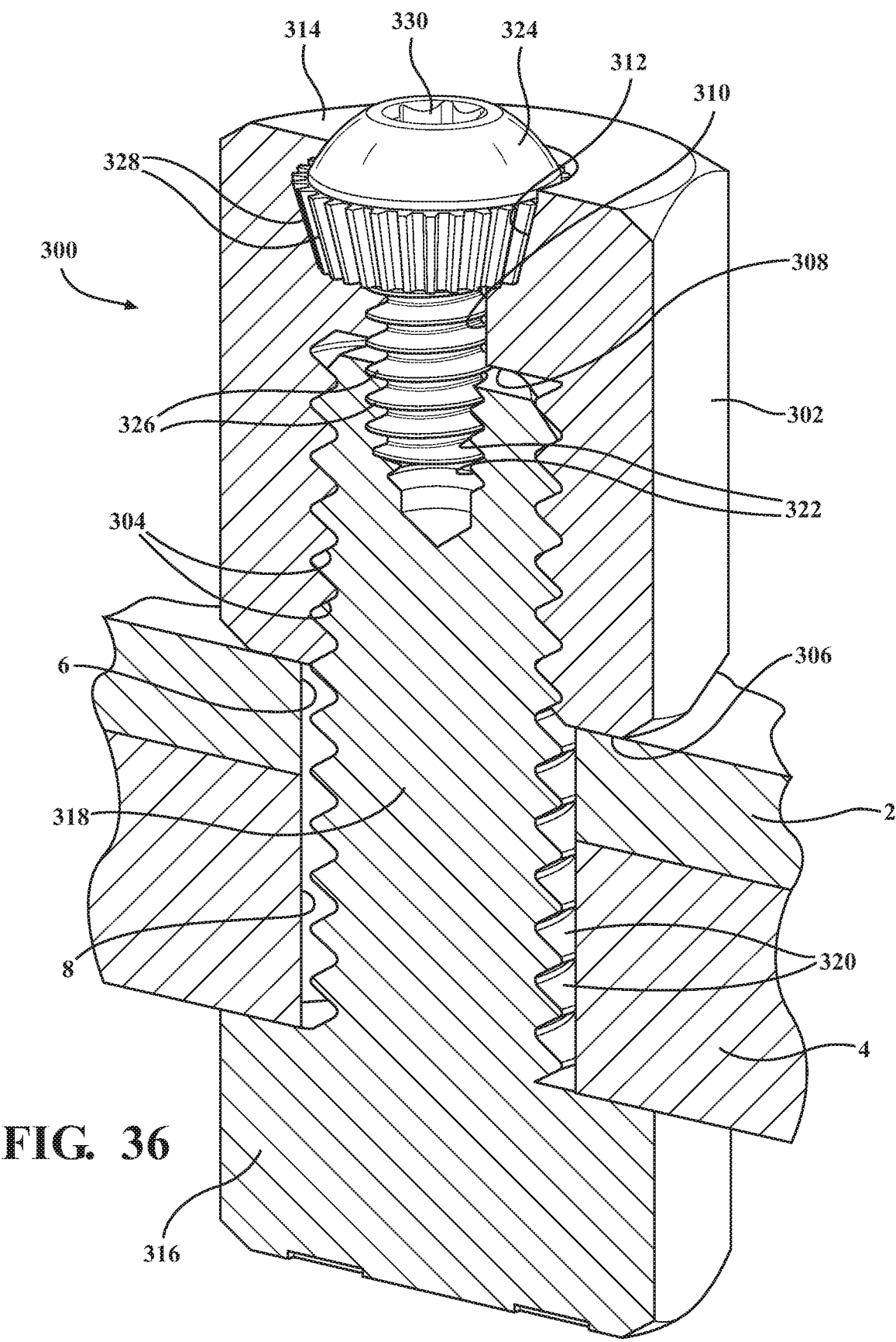
FIG. 36 is a linear cutaway of a multi-piece fastener assembly according to a further preferred embodiment and depicting an arrangement including a nut with interior threads extending from a first end to an intermediate end wall, a narrowed diameter aperture extending from the end wall toward a second end, a first screw having a shaft exhibiting a first exterior thread pattern rotationally inter-engaging with the interior threads of the nut when installed through the first end, a recess formed in an end of the shaft exhibiting a further plurality of interior threads matching a direction of the first thread pattern, a second screw having a second exterior thread pattern opposite the first pattern and, upon being installed through the narrowed aperture, rotationally inter-engaging the interior threads of the first screw, with loosening of either screw being prevented by their counter-threaded orientation, a head of the second screw also exhibiting an outer annular and dovetail shaped rim establishing a resistance fit within an entranceway location of the nut.

Referring now to FIG. 36 an illustration is generally shown at 300 in linear cutaway of a multi-piece fastener assembly according to a further preferred embodiment for sandwiching and engaging together first 2 and second 4 layers having aligning apertures 6 and 8 (see again FIG. 4). A modified nut having a generally polygonal outer profile is shown at 302 and is provided with interior threads 304 extending from a first (lower) end 306 to an intermediate located end wall 308. A narrowed diameter aperture 310 communicates and extends from the end wall 308 and, in the non-limiting embodiment illustrated, transitions into a dovetail shaped entranceway passageway 312 communicating with a second end 314 of the nut 302.

A first screw includes an enlarged head 316 and a shaft 318 upon which is configured a first exterior thread pattern 320 rotationally inter-engaging with the interior threads 304 of the nut 302 when installed through the first end 306. A recess is formed in an end of the shaft 318 and exhibits a further plurality of interior threads 322 matching a direction of the first thread pattern 304.

A second screw includes an enlarged head 324 and a second smaller shaft having a second exterior thread pattern 326 configured opposite the first pattern 304. Upon being installed through the narrowed aperture 310, the second thread pattern 326 rotationally inter-engages the interior shaft end threads 322 of the first screw, with loosening of either screw being prevented by their counter-threaded orientation.

The head 324 of the second screw exhibits an outer annular and dovetail shaped rim profile, this further constituted by which a plurality of vertical and circumferentially spaced protuberances 328. As the second screw is engaged to the interior threads 322 of the first screw, such as via a bit receiving pattern 330 configured in the head 324, the protuberant pattern 328 establishes a resistance fit within and against the likewise dovetail profile established by the entranceway location 312 of the nut 302, which serves to further inhibit any initial loosening of the second screw.

Figure 37:
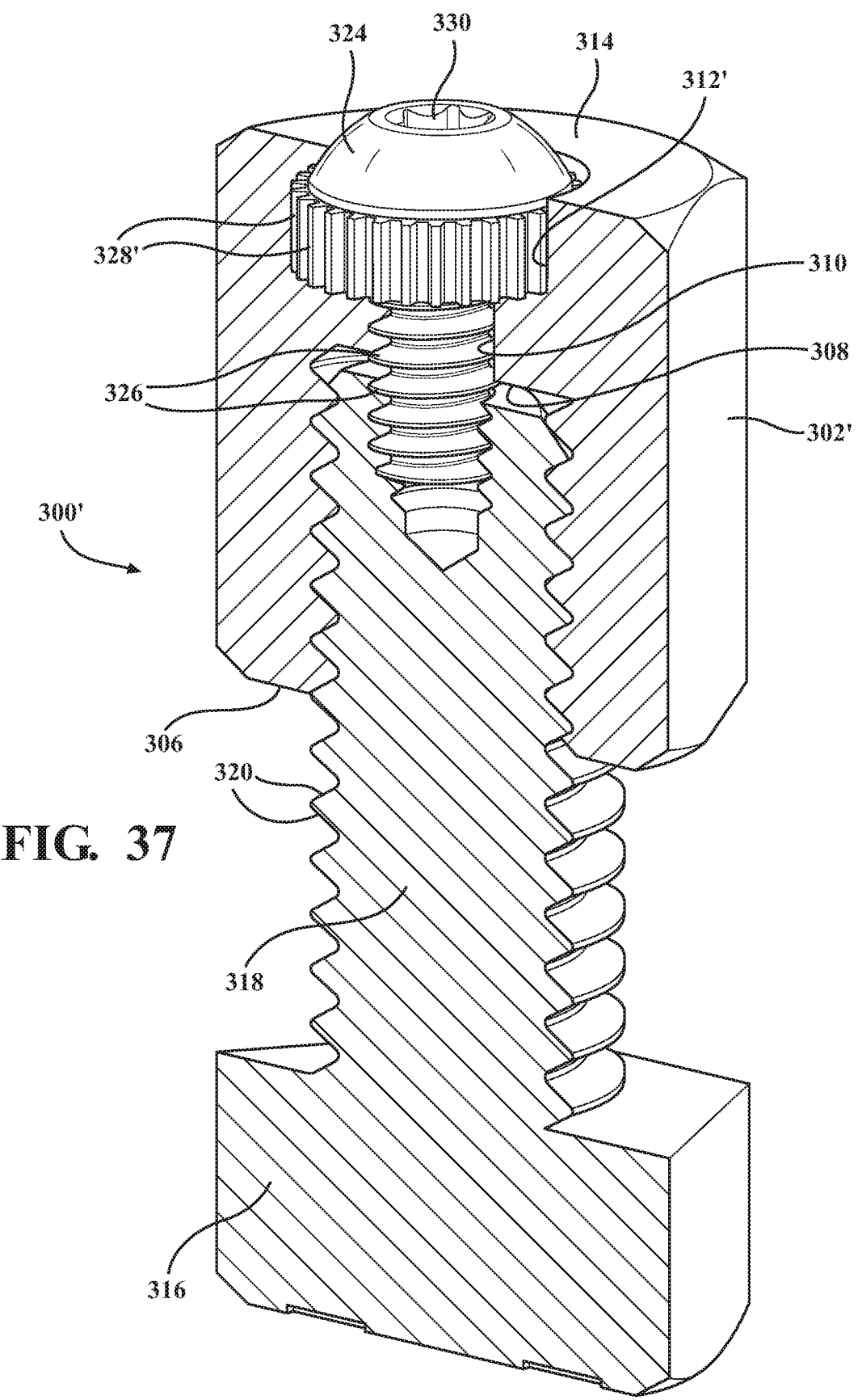
FIG. 37 is an illustration of a sub-variant of FIG. 36 in which the mating dovetail pattern of the second screw head and entranceway location is substituted by a linear entranceway extending between the second end of the nut and the narrowed diameter aperture.
Figure 38:
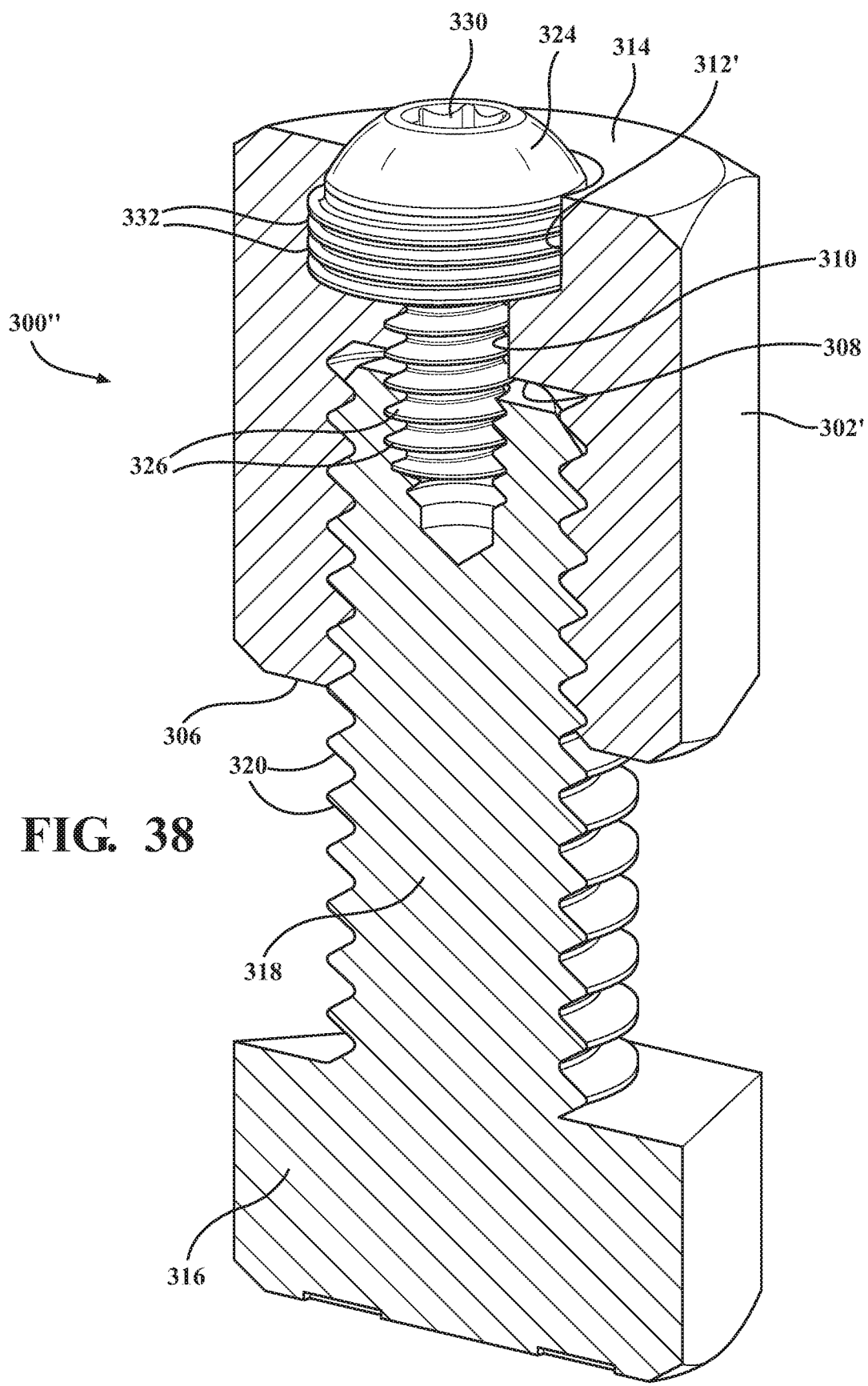
FIG. 38 is a similar illustration of a further sub-variant in which a plurality of vertical and circumferentially spaced protuberances configured upon the outer annular rim of the second head in each of FIGS. 36-37 is substituted by a spiraling protuberant pattern.

FIG. 37 is an illustration of a sub-variant, generally at 300' of FIG. 36 in which the mating dovetail pattern of the second screw head and entranceway location is substituted by a linear relationship, as reflected by reconfigured passageway 312' within the redesigned nut 302' with annular outer protuberant pattern being likewise reconfigured as shown at 328'. FIG. 38 is a similar illustration of a further sub-variant 300" in which a plurality of vertical and circumferentially spaced protuberances configured upon the outer annular rim of the second head is substituted by a spiraling protuberant pattern 332. All other features consistent with those of FIG. 36 are repetitively numbered.

Figure 39:
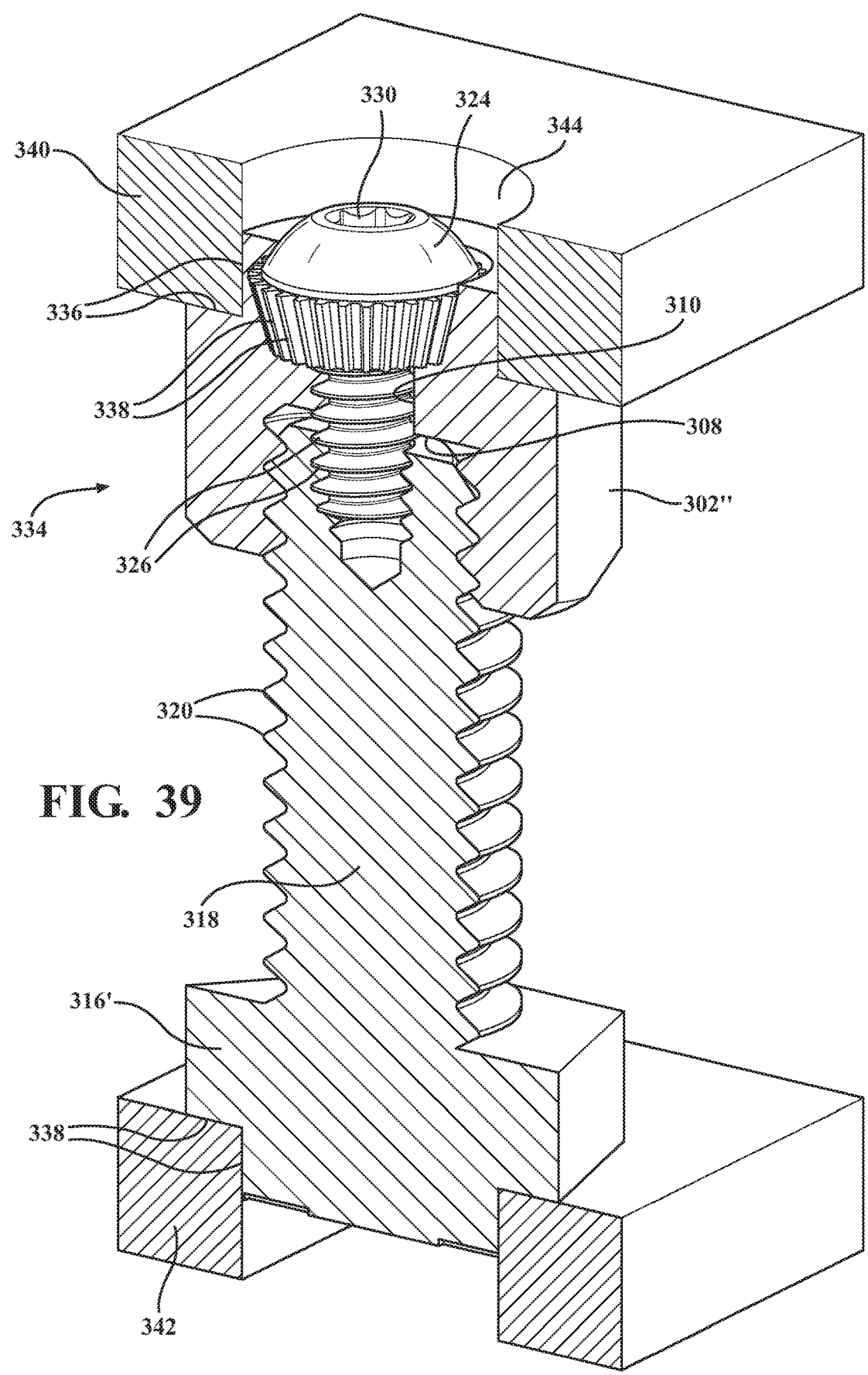
FIG. 39 is an illustration of a sub-variant of FIG. 36 and contemplates the fastener assembly being incorporated into a foot or pedestal support of a machine or other appliance for providing combined ground support and leveling, with each of the second (upper) end of the nut and the (lower) end of the enlarged head of the first screw notched for seating each of upper and lower configured support layers, these further incorporating rotational bearing surfaces, at least the upper support layer includes an aperture for permitting passage of a tool bit for engaging the head of the second screw and which, upon rotation in a tightening direction, facilitating uni-directional linear adjustment of the nut relative to the first screw.

Proceeding to FIG. 39, an illustration is generally shown at 334 of a sub-variant of the fastener assembly as also shown in FIG. 36 and contemplates the fastener assembly being incorporated into a foot or pedestal support of a machine or other appliance (not shown) for providing combined ground support and leveling. Each of the second (upper) end of the nut 302" and the (lower) end of the enlarged head 316' of the first screw are reconfigured by inward notches (see at 336 and 338, respectively) for seating each of upper 340 and lower 342 configured support layers.

Without limitation, each of the support layers can incorporate rotational bearing surfaces (not shown). At least the upper support layer 342 further includes an aperture (defined by inner closed rim edge 344) for permitting passage of a tool bit (not shown) for engaging the head 324 of the second screw and which, upon rotation in a tightening direction, facilitating uni-directional linear adjustment of the nut 302" relative to the first screw.

Figure 40:
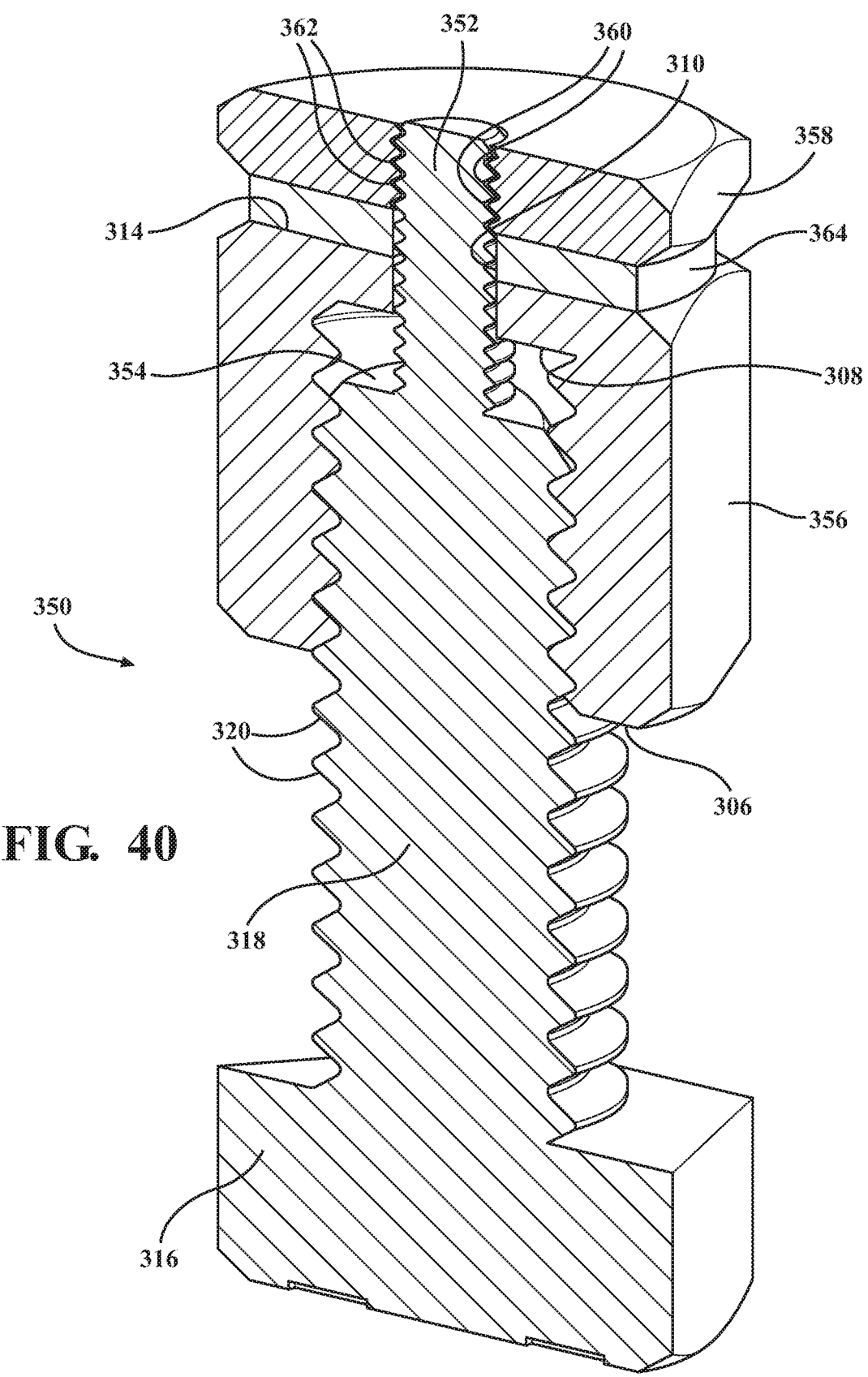
FIG. 40 presents a further related embodiment substitutes the second screw with a reconfiguration of the first screw to incorporate a second reduced diameter and counter-threaded shaft integrally extending beyond an end wall of the first threaded shaft and so that, upon threaded installation through the first end of the nut, an end most portion of the second reduced diameter and counter threaded shaft extends beyond the second end of the nut, a second nut exhibits interior threads mating with those of the projecting end most portion of the second reduced diameter shaft and, upon installation, provides counter tightening via the opposing thread patterns of the first and second shafts.

Referring finally to FIG. 40, a further linear cutaway is generally depicted at 350 according to a related embodiment and which substitutes the second screw with a reconfiguration of the (first) screw to incorporate a second reduced diameter and counter-threaded shaft 352 integrally extending beyond an end wall 354 of the first threaded shaft (again at 318) and so that, upon initial threaded installation through the first end of a further reconfigured nut 356, an end most portion of the second reduced diameter and counter threaded shaft 352 extends beyond the second end 314 of the nut. The dovetail or linear entranceway passage is removed in FIG. 40 and the narrowed diameter passageway 310 is extended as compared to FIGS. 36-39.

As further shown, a second flattened nut 358 is provided and exhibits interior threads mating with those of the projecting end most portion of the second reduced diameter shaft 352 and, upon inter-engaging installation of interior threads 360 of the second nut 358 with opposing exterior threads 362 of the second reduce diameter shaft 352, provides counter tightening via the opposing thread patterns of the first shaft (again at 320) and the second shaft (again at 362). A compressible washer 364 is provided and can be positioned between the first and second nuts for providing additional resistive engagement and in order to prevent initial loosening of the second nut 358, again owing to the counter-threaded orientation. As shown in FIG. 36, a pair of layers 2 and 4 can be sandwiched between the enlarged head 316 of the (first) screw and the opposing first end 306 of the nut 356.

In each variant, the nut and first and second screws can be constructed of any suitable material not limited to any of metal, polymer (such as heavy duty nylon) or other composite. Accordingly, the present fastener assembly provides superior resistance to loosening of the fastener assembly, such as in response to extended vibrations or other external/environmental factors which can cause loosening of prior art fastener designs, even with the use of spring washers or the like.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A fastener assembly, comprising:
   a nut having interior threads extending from a first end and terminating in an intermediate end wall, a narrowed diameter aperture extending from said end wall toward a second end of said nut;
   a first screw having a first shaft exhibiting a first exterior thread pattern rotationally inter-engaging with said interior threads of said nut when installed through said first end, a recess formed in an end of said first shaft exhibiting a further plurality of interior threads matching a direction of said first thread pattern, said recess being in communication with said narrowed diameter aperture;
   a second screw having a second shaft exhibiting a second exterior thread pattern opposite said first pattern and, upon being installed through said narrowed diameter aperture, rotationally inter-engaging said interior threads of said first screw, with loosening of either of said first and second screws being prevented by their counter-threaded orientation; and
   a head of said second screw exhibiting an annular outer rim comprising an axial extent for establishing a resistance fit against an opposing surface within said nut defining an entranceway location in communication with said narrowed diameter aperture.

2. The fastener assembly of claim 1, further including first and second layers having aligning apertures through which said first shaft extends during installation of said assembly, further comprising said layers adapted to being compressed between said first end of said nut and an enlarged head of said first screw.

3. The fastener assembly of claim 2, each of said nut and said enlarged head of said first screw further comprising a polygonal cross sectional shape compressing against opposite edge surfaces of said layers adjoining the aligning apertures.

4. The fastener assembly of claim 1, said second screw further comprising an enlarged head.

5. The fastener assembly of claim 4, further comprising a tool bit engageable recess profile incorporated into said enlarged head.

6. The fastener assembly of claim 1, said nut and said first and second screws each further comprising a rigid material not limited to a steel, heavy-duty nylon or other metal or polymeric composite.

7. The fastener assembly of claim 1, said outer annular rim of said second screw and said entranceway location of said nut each further comprising a dovetail profile.

8. The fastener assembly of claim 1, said outer annular rim of said second screw and said entranceway location of said nut each further comprising a linear profile.

9. The fastener assembly of claim 1, further comprising a plurality of vertical and circumferentially spaced protuberances configured upon said outer annular rim of said head of said second screw.

10. The fastener assembly of claim 1, further comprising a spiraling protuberant pattern configured upon said outer annular rim of said head of said second screw.

11. The fastener assembly of claim 1, said first screw further comprising an enlarged head, each of said second end of said nut and a lower end of said enlarged head including inward notches for respectively seating upper and lower support layers for incorporating said assembly into a pedestal support structure incorporated into an underside of a machine or appliance for assisting in vertically adjustable leveling thereof.

12. The fastener assembly of claim 11, further comprising at least said upper support layer having an aperture permitting passage of a tool bit adapted for engaging said head of said second screw and which, upon rotation in a tightening direction, facilitating uni-directional linear adjustment of said nut relative to said first screw.

13. A fastener assembly, comprising:
a first nut having interior threads extending from a first end and terminating in an intermediate end wall, a narrowed diameter aperture extending from said end wall toward a second end of said first nut;
a screw having a first shaft exhibiting a first exterior thread pattern rotationally inter-engaging with said interior threads of said nut when installed through said first end;
said screw further including a second reduced diameter and counter-threaded shaft integrally extending beyond an end of said first exterior thread pattern of said shaft and so that, upon initial threaded installation of said screw through said first end of said first nut, an end most portion of said second shaft extending beyond said second end of said first nut;
a second nut exhibiting interior threads mating with said counter-threads of said second reduced diameter shaft so that, upon installation of said second nut, loosening of said screw relative to said first and second nuts is avoided owing to the counter-threaded orientation of said first and second shafts; and
a compressible washer positioned between said first and second nuts for providing additional resistive engagement and in order to prevent initial loosening of said second nut.

14. The fastener assembly of claim 13, said second nut exhibiting a flattened profile.

15. The fastener assembly of claim 13, further including first and second layers having aligning apertures through which said first shaft extends during installation, and further comprising said layers adapted to being compressed between said first end of said first nut and an enlarged head of said screw.

16. The fastener assembly of claim 15, each of said first and second nuts and said enlarged head of said screw further comprising a polygonal cross sectional shape compressing against opposite edge surfaces of said layers adjoining the aligning apertures.

17. The fastener assembly of claim 13, said first and second nuts and said screw each further comprising a rigid material not limited to a steel, heavy-duty nylon or other metal or polymeric composite.

18. A fastener assembly, comprising:
a first nut having interior threads extending from a first end and terminating in an intermediate end wall, a narrowed diameter aperture extending from said end wall toward a second end of said first nut;
a screw having a first shaft exhibiting a first exterior thread pattern rotationally inter-engaging with said interior threads of said nut when installed through said first end;
said screw further including a second reduced diameter and counter-threaded shaft integrally extending beyond an end of said first exterior thread pattern of said shaft and so that, upon initial threaded installation of said screw through said first end of said first nut, an end most portion of said second shaft extending beyond said second end of said first nut; and
a second nut exhibiting a flattened profile and having interior threads mating with said counter-threads of said second reduced diameter shaft so that, upon installation of said second nut, loosening of said screw relative to said first and second nuts is avoided owing to the counter-threaded orientation of said first and second shafts.

* * * * *